United States Patent
Magnus et al.

(10) Patent No.: US 12,290,764 B2
(45) Date of Patent: May 6, 2025

(54) METHOD AND APPARATUS FOR REMOVAL OF PARTICULATE MATTER FROM A MULTIPHASE STREAM

(71) Applicants: Norcan Steel Products Inc., Stettler (CA); 2144811 Alberta Inc., Strathcona (CA); Donald Clifford Bowes, Calgary (CA)

(72) Inventors: Andrew Kenneth Magnus, Calgary (CA); Donald Clifford Bowes, Calgary (CA); Anthony James Vanderlee, Stettler (CA)

(73) Assignees: 2144811 Alberta Inc., Calgary (CA); Norcan Steel Products Inc., Stettler (CA); Donald Clifford BOWES, Calgary (CA)

( * ) Notice: Subject to any disclaimer, the term of this patent is extended or adjusted under 35 U.S.C. 154(b) by 64 days.

(21) Appl. No.: 18/339,164

(22) Filed: Jun. 21, 2023

(65) Prior Publication Data

US 2023/0330565 A1    Oct. 19, 2023

Related U.S. Application Data

(62) Division of application No. 16/437,077, filed on Jun. 11, 2019, now Pat. No. 11,724,214.

(Continued)

(51) Int. Cl.
*B01D 19/00* (2006.01)
*B01D 21/00* (2006.01)
(Continued)

(52) U.S. Cl.
CPC ..... *B01D 19/0068* (2013.01); *B01D 19/0042* (2013.01); *B01D 19/0063* (2013.01);
(Continued)

(58) Field of Classification Search
CPC ............ B01D 19/0068; B01D 19/0042; B01D 19/0063
See application file for complete search history.

(56) References Cited

U.S. PATENT DOCUMENTS

| 2,756,837 A | 7/1956 | Lovelady et al. |
| 2,903,088 A | 2/1957 | Spann |

(Continued)

FOREIGN PATENT DOCUMENTS

| CA | 2229301 A1 | 8/1999 |
| WO | 2004005673 A1 | 1/2004 |

(Continued)

OTHER PUBLICATIONS

ISA Canadian Intellectual Property Office, International Search Report Issued in Application No. PCT/CA2019/050817, Aug. 22, 2019, WIPO, 4 pages.

(Continued)

*Primary Examiner* — Robert A Hopkins
(74) *Attorney, Agent, or Firm* — McCoy Russell LLP

(57) ABSTRACT

A system for removing particulate matter from a multiphase stream comprising gas, liquid and the particulate matter. The system comprises a first vessel for receiving the multiphase stream and separating a majority of gas from the multiphase stream and collecting a slurry of liquid and particulate matter; a second vessel for receiving the slurry and causing separation of the particulate matter from the liquid and for generating a pressure head of liquid against the particulate matter; a third vessel for receiving the particulate matter from the second vessel and collecting the particulate matter until a pre-determined mass or volume of particulate matter is collected; and an outlet in the third vessel for conveying the particulate matter out of the third vessel.

20 Claims, 16 Drawing Sheets

Related U.S. Application Data

(60) Provisional application No. 62/684,571, filed on Jun. 13, 2018.

(51) Int. Cl.
*B01D 21/02* (2006.01)
*E21B 43/34* (2006.01)

(52) U.S. Cl.
CPC ......... *B01D 21/0024* (2013.01); *B01D 21/02* (2013.01); *E21B 43/34* (2013.01); *E21B 43/35* (2020.05)

(56) References Cited

U.S. PATENT DOCUMENTS

| | | | |
|---|---|---|---|
| 3,430,814 | A | 3/1969 | Cymbalisty |
| 4,474,049 | A | 10/1984 | Hansen et al. |
| 4,883,390 | A | 11/1989 | Reintjes et al. |
| 5,082,556 | A | 1/1992 | Reese |
| 5,173,092 | A | 12/1992 | Rudder |
| 5,211,842 | A | 5/1993 | Tuss et al. |
| 5,524,665 | A | 6/1996 | Kolpak |
| 6,214,092 | B1 | 4/2001 | Odom et al. |
| 7,785,400 | B1 | 8/2010 | Worley et al. |
| 8,070,141 | B2 | 12/2011 | Kooijman et al. |
| 8,317,904 | B2 | 11/2012 | Sarshar et al. |
| 9,861,921 | B2 | 1/2018 | Hemstock et al. |
| 9,873,067 | B1 | 1/2018 | Ball, IV |
| 9,925,484 | B2 | 3/2018 | Lyon et al. |
| 10,525,381 | B2 | 1/2020 | McNaughton et al. |
| 2003/0050736 | A1 | 3/2003 | Nelson et al. |
| 2003/0075489 | A1 | 4/2003 | Lakshman |
| 2003/0168391 | A1 | 9/2003 | Tveiten |
| 2004/0065628 | A1 | 4/2004 | Fout et al. |
| 2004/0182754 | A1 | 9/2004 | Lange |
| 2005/0029204 | A1 | 2/2005 | Schwartzkopf |
| 2011/0036239 | A1 | 2/2011 | Sarshar et al. |
| 2014/0352538 | A1 | 12/2014 | Larnholm et al. |
| 2016/0375386 | A1 | 12/2016 | Magnus et al. |
| 2016/0375836 | A1 | 12/2016 | Bathelier et al. |
| 2017/0022807 | A1 | 1/2017 | Dursun et al. |

FOREIGN PATENT DOCUMENTS

| | | |
|---|---|---|
| WO | 2005094962 A1 | 10/2005 |
| WO | 2015093935 A1 | 6/2015 |

OTHER PUBLICATIONS

ISA Canadian Intellectual Property Office, Written Opinion of the International Searching Authority Issued in Application No. PCT/CA2019/050817, Aug. 22, 2019, WIPO, 3 pages.

IP Australia, Examination Report issued in Application No. 2019284238, Mar. 13, 2024, 2 pages.

METHOD AND APPARATUS FOR REMOVAL OF PARTICULATE MATTER FROM A MULTIPHASE STREAM

CROSS-REFERENCE TO RELATED APPLICATIONS

The present application is a divisional of U.S. Non-Provisional patent application Ser. No. 16/437,077, entitled "METHOD AND APPARATUS FOR REMOVAL OF PARTICULATE MATTER FROM A MULTIPHASE STREAM", and filed on Jun. 11, 2019. U.S. Non-Provisional patent application Ser. No. 16/437,077 claims priority to U.S. Provisional Patent Application No. 62/684,571 filed Jun. 13, 2018. The entire contents of the above-listed applications are hereby incorporated by reference for all purposes.

BACKGROUND OF THE INVENTION

(1) Field of the Invention

The invention relates to devices and systems for separation of sand and other particulates from a multiphase stream. Some embodiments are directed particularly to uses of such systems and methods for separating sand from hydrocarbon production streams issuing from oil and gas wells following hydraulic fracturing operations.

(2) Description of the Related Art

In the last decade, significant strides in recovery of hydrocarbons by hydraulic fracturing have been made. Fracturing involves the injection, at very high pressure, of a fluid (typically mainly water) with a proppant (typically silica sand). Fracturing has allowed increased production of oil and gas from low porosity formations such as shale, coal seams and generally tight zones.

After a fracturing operation, the well is tested and then completed for production. Even after this completion stage, significant quantities of fracturing fluid, sand used as proppant and other particulates flow back to the surface along with hydrocarbons and formation water. The highly erosive nature of this initial production creates significant problems in production equipment downstream of the well.

These difficulties have been handled by placing sand separation equipment immediately downstream of the well. The sand separation equipment is typically kept in place until the sand flow-back reduces to an acceptable level. A number of different sand separation devices have been developed at various levels of complexity.

Examples of single-stage sand separation devices consisting of a single container or vessel are described, for example in U.S. Pat. Nos. 2,903,088, 7,785,400, 9,861,921, 9,873,067, and 9,925,484, and Canadian Patent Application No. 2,229,301, each of which is incorporated herein by reference in its entirety. Examples of two-stage sand separator systems are described, for example in US Patent Application Nos. 20030168391 and 20160375386 and in PCT Publication Nos. WO 2004/005673, WO2005/094962, and WO 2015/093935, each of which is incorporated herein by reference in its entirety.

There continues to be a need for improvements in systems and devices used for removal of particulate matter in particulate streams, particularly in connection with fractured wells producing hydrocarbons.

BRIEF SUMMARY OF THE INVENTION

In accordance with one aspect of the invention, there is provided a system for removing particulate matter from a multiphase stream comprising gas, liquid and the particulate matter, the system comprising: a) a first vessel for receiving the multiphase stream and separating a majority of gas from the multiphase stream and collecting a slurry of liquid and particulate matter; b) a second vessel for receiving the slurry and causing separation of the particulate matter from the liquid and for generating a pressure head of liquid against the particulate matter; c) a third vessel for receiving the particulate matter from the second vessel and collecting the particulate matter until a pre-determined mass or volume of particulate matter is collected; and d) an outlet in the third vessel for conveying the particulate matter out of the third vessel.

In some embodiments, the system further comprises a pressure head element, also referred to herein as a conditioner, connected to the second vessel via a liquid conduit, the pressure head element having an inner diameter greater than the liquid conduit's inner diameter.

In some embodiments, the first vessel is spherical and the second and third vessels are vertically arranged cylindrical vessels.

In some embodiments, the first vessel has an upper gas outlet conduit for removal of gas.

In some embodiments, the pressure head element (i.e., conditioner) has an outlet conduit in liquid flow communication with the upper gas outlet conduit.

In some embodiments, the multiphase stream is carried into the first vessel via an inlet conduit having a terminal flow diverter structure providing downward tangential flow against a curved inner sidewall of the first vessel.

In some embodiments, the system further comprises a first valve for halting flow of the slurry into the second vessel.

In some embodiments, the system further comprises a second valve for controlling internal pressure of the second vessel.

In some embodiments, the system further comprises a third valve for controlling flow of the particulate matter out of the second vessel.

In some embodiments, the system further comprises a fourth valve for controlling the flow of the particulate matter out of the third vessel.

In some embodiments, the system further comprises a mass or volume measuring element for determining the mass or volume of particles in the second vessel.

In some embodiments, the mass or volume measuring element is a load cell.

In some embodiments, the mass or volume measuring element is in electronic communication with a valve control system for controlling flow of the particulate matter out of the second vessel.

In some embodiments, the system is mounted on a transportable platform.

In some embodiments, the multiphase stream is production from a fractured well, the particulate matter comprises sand and the liquid comprises hydrocarbons and water.

In some embodiments, the first, second and third vessels have inner walls resistant to reaction with hydrogen sulfide.

In some embodiments, the system further comprises one or more conduits in communication with the first vessel, the second vessel or the third vessel, or any combination thereof, for conveying gas to a flare system.

Another aspect of the invention is a use of the system as described herein for removing tailings from water used in a mining operation.

Another aspect of the invention is a use of the system as described herein for removing particulate matter from water in a water treatment process.

Another aspect of the invention is a method for removing particulate matter from a multiphase stream containing gas and liquid, the method comprising: a) conveying the multiphase stream to a first vessel having a curved interior sidewall and diverting the multiphase stream in tangential flow against the curved interior sidewall thereby causing at least a portion of the gas to escape via an upper outlet in the first vessel while the remaining liquid and particulate matter form a slurry in the first vessel; b) conveying the slurry to a second vessel wherein the particulate matter settles in the bottom of the second vessel with the liquid above the particulate matter moving upward to an upper outlet conduit, wherein the liquid above the particulate matter forms a pressure head, thereby causing compression of the particulate matter to force out entrained liquid, until a pre-determined mass of particulate matter is contained in the second vessel; c) conveying the particulate matter from the second vessel to a third vessel; and d) repeating steps a) to c) until a pre-determined volume of particulate matter is contained in the third vessel, after which the particulate matter is conveyed out of the third vessel.

In some embodiments, the second vessel includes a mass measurement element for determining the mass of particulate matter contained in the second vessel.

In some embodiments, the first vessel is spherical and the multiphase flow is diverted downward.

In some embodiments, the pressure head is increased by inclusion of a pressure head element (a.k.a., a conditioner) in liquid flow communication with the second vessel via a first conduit connecting the pressure head element with the second vessel.

In some embodiments, the pressure head element (conditioner) is a second conduit having an inner diameter greater than the first conduit's inner diameter.

In some embodiments, step a) occurs continuously and step b) is halted when step c) occurs.

In some embodiments, the particulate matter is predominately sand and the multiphase flow is production from a hydraulically fractured well.

Another aspect of the invention is a use of the method as described herein for removing tailings from water used in a mining operation.

Another aspect of the invention is a use of the method as described herein for removing particulate matter from water in a water treatment process.

Disclosed according to an exemplary embodiment is a system for removing particulate matter from a multiphase stream comprising gas, liquid and the particulate matter. The system comprises a first vessel for receiving the multiphase stream and separating a majority of gas from the multiphase stream and collecting a slurry of liquid and particulate matter; a second vessel for receiving the slurry and causing separation of the particulate matter from the liquid and for generating a pressure head of liquid against the particulate matter; a third vessel for receiving the particulate matter from the second vessel and collecting the particulate matter until a pre-determined mass or volume of particulate matter is collected; and an outlet in the third vessel for conveying the particulate matter out of the third vessel.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

Figure 1:
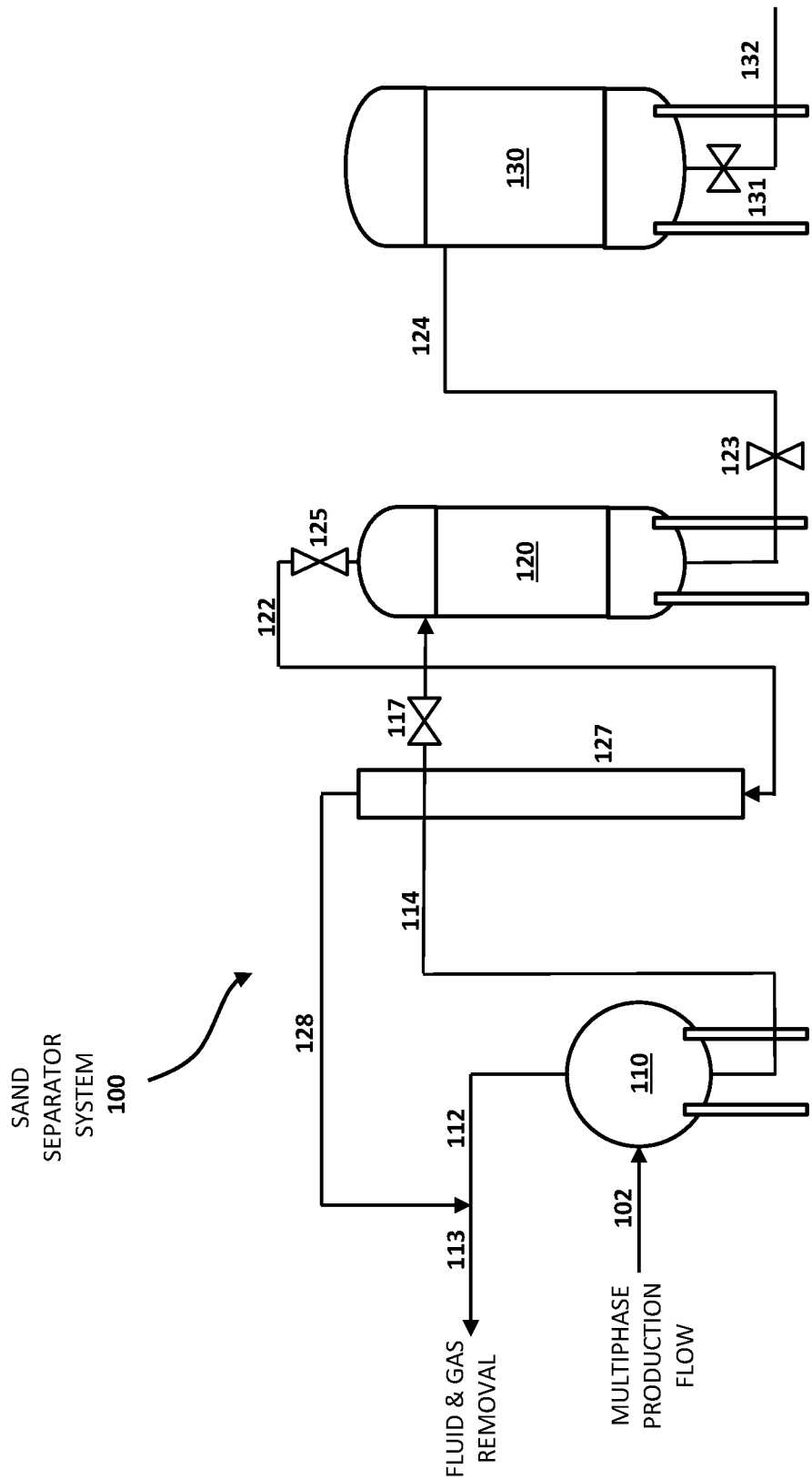
FIG. 1 is a process flow diagram for one embodiment of a sand separator system showing flow of a multiphase production flow from a fractured well with separation of gas in a first separator vessel and accumulation of sand in an accumulator vessel in a first phase of operation.

Devices and systems currently in use for separating particulate matter from produced hydrocarbons and water (referred to herein as "sand separators") have a number of shortcomings. For example, early stage production from fractured wells will often include large volumes of liquids known as "slugs" which will overcome single stage sand separation devices and such events will often require halting production while the devices are restored for continued operation. In addition, single stage devices tend to lack the capability to conveniently offload the sand and other particulate matter collected therein (hereinafter collectively referred to as "sand") and as a result, require addition of bypass systems and/or manual removal of the sand, which will typically require killing production. This is particularly relevant for horizontal separator tanks which typically require manual scraping of solids from the interior of such tanks.

Another problem experienced by existing sand separator devices and systems is that significant volumes of liquid hydrocarbons become entrained in the sand and the sand is not processed sufficiently to recover these entrained hydrocarbons, leading to loss of the valuable resource when the sand is recovered. In addition, the majority of such devices and systems rely upon cyclonic action and use cyclone separators to effect the separation. Cyclonic action requires consistent flow input of materials. The liquid slugs experienced during production from fractured wells causes breakdown of optimal cyclonic action, causing problems in process flow.

One of the more advanced two-stage sand separator systems is described in US Patent Publication No. 20160375386, which is incorporated herein by reference in its entirety. This two-stage system includes a pair of similar spherical tanks operating in series with one another with sand collecting at the bottom of the first spherical tank being transferred over to the second tank where it is removed at an outlet directly dumping the sand to an open container or a transport vehicle. The inventors of the present application have recognized that while this system provides some advantages over single stage sand separator systems, it also has a number of shortcomings. For example, while it is effective in separating gas from the rest of the input stream in the first stage, significant volumes of liquid hydrocarbons will remain entrained in the sand in the materials handling process occurring in the second tank and, as a result, these entrained hydrocarbons are lost with the sand when it is dumped to an external storage container or transport vehicle. The present inventors thus recognized that provision of a mechanism to promote additional settling of sand collected in a second stage vessel would enable users to recover more liquid hydrocarbons entrained in the sand. In addition, the inventors recognized that the structure of the second spherical tank of the two-stage system would complicate the process of evacuation of sand. At least two problems have been recognized with regard to the use of the second spherical tank in the two stage system: (1) excessive liquids will be retained in the second tank; and (2) these excess liquids, which include significant volumes of hydrocarbons, will then be removed with the sand and both will be sent to disposal at a significant cost to the operator. Embodiments of the present invention address both of these problems, among others, by preventing significant loss of hydrocarbons in the second stage. This results in significant capital gains for retaining hydrocarbons as products and reducing transport and disposal expenses.

It is expected that the commercial embodiment of the system of US Patent Publication No. 20160375386 would require approximately 30 minutes to empty sand from the second stage tank. While this represents an improvement over horizontal single stage pipe vessels, there remains a significant likelihood during a 30-minute period that a slug of liquid and sand could wash away the contents of the first tank. Embodiments of the present invention provide the ability to empty sand within about 5 minutes, greatly reducing the risk of overfilling of the first tank.

The inventors of the present invention have recognized that certain process improvements for separation of sand from a multiphase stream provide solutions to the above-mentioned problems in a controlled and predictable process capable of handling slugs of production liquids without any significant input of energy for the operations by taking advantage of natural input pressure and gravity-based fluid flow through the three stages.

Various aspects of the invention will now be described with reference to the figures. For the purposes of illustration, components depicted in the figures are not necessarily drawn to scale in all cases. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Features and Operation of a First Embodiment of a Sand Separator System

Figure 2:
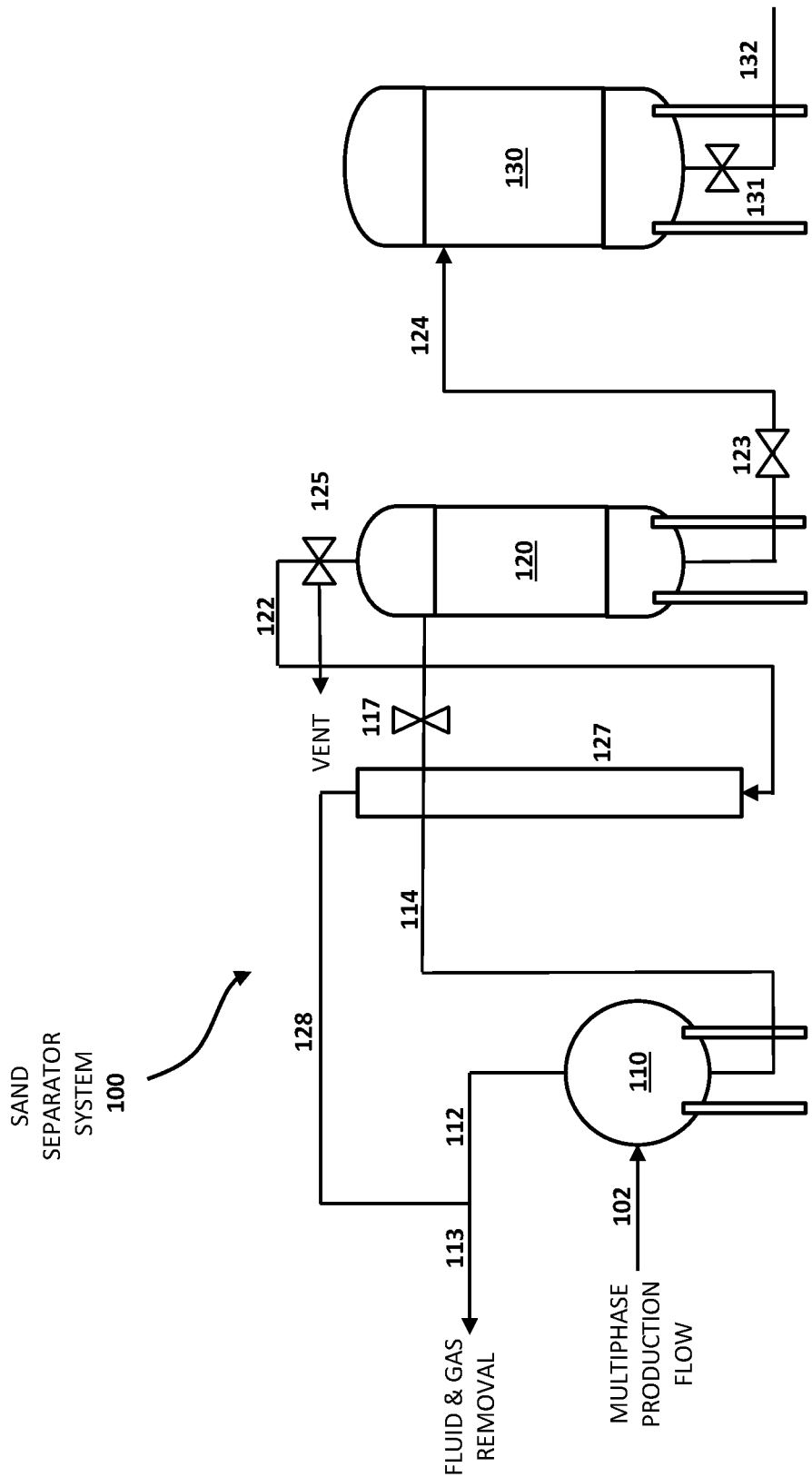
FIG. 2 is a process flow diagram for the system of FIG. 1 in a second phase of operation when sand is evacuated from the accumulator vessel and sent to a sand containment vessel while the multiphase production flow continues to enter the separator vessel.
Figure 3:
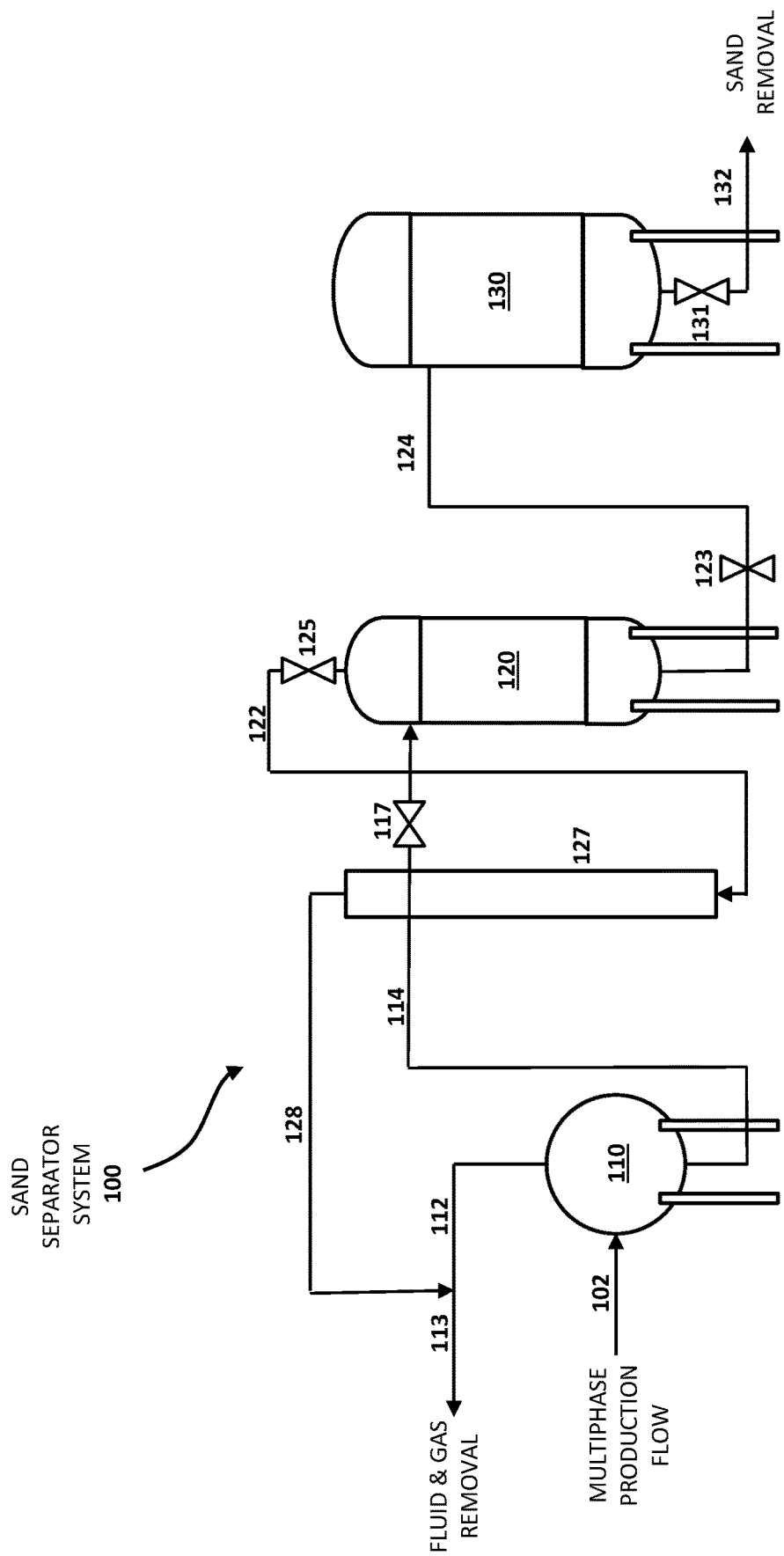
FIG. 3 is a process flow diagram for the system of FIG. 1 in a third phase of operation when sand is evacuated from the sand containment vessel and the rest of the system continues to operate as illustrated in FIG. 1.

Turning now to FIG. 1, FIG. 2, and FIG. 3, there is shown one example embodiment of a general three-stage system 100 in different phases of operation for separating sand from a multiphase stream containing water, sand and hydrocarbons (including both liquids and gases) as major components and for moving sand out of the system 100, wherein active flow is shown with arrows as influenced by valve positions. The reference numerals used in FIGS. 1-3 are listed in Table 1.

TABLE 1

Reference Numerals of FIGS. 1-3

| Reference Numeral | Component |
| --- | --- |
| 100 | System |
| 102 | Conduit: production flow input |
| 110 | Separator vessel |
| 112 | Conduit: from top of separator vessel |
| 113 | Conduit: Fluid and gas removal from system |
| 114 | Conduit: Separator to accumulator |
| 117 | Valve in conduit 114 |
| 120 | Accumulator vessel |
| 122 | Conduit: Accumulator vessel to pressure head element (conditioner) |
| 123 | Valve in conduit 124 |
| 124 | Conduit: Accumulator to sand containment vessel |
| 125 | Valve in conduit 122 |
| 127 | Pressure head element (conditioner) |
| 128 | Conduit: pressure head element to conduit 112 |

TABLE 1-continued

Reference Numerals of FIGS. 1-3

| Reference Numeral | Component |
|---|---|
| 130 | Sand containment vessel |
| 131 | Valve in conduit 132 |
| 132 | Conduit: sand removal from sand containment vessel |

The system includes a separator vessel 110, an accumulator vessel 120 and a containment vessel 130. The system operates with continuous multiphase production flow input from a producing well that had previously been fractured and completed for production. In this embodiment, the multiphase production flow input is flowing via conduit 102 under natural reservoir pressure into the separator vessel 110 without any regulation of flow rate. Alternative embodiments may employ a conventional pressure regulating device in line with the conduit 102 serving to convey the multiphase production flow. Because there is no requirement for cyclonic flow in the separator vessel 110, the flow may be advantageously slowed by providing a larger than conventional input conduit, for example a conduit having an inner diameter of about 3 to about 4 inches. The multiphase production flow input stream enters the separator vessel 110, which in this particular embodiment is a spherical tank. Other embodiments of the system may use separator tanks with different shapes. However, it is advantageous to use a separator tank having a curved interior sidewall because tangential flow of the input stream against the curved interior sidewall promotes separation of the multiphase components, particularly gas from the liquid and sand slurry. Examples of such tanks may include, but are not limited to, cylindrical tanks arranged vertically, and cyclone separators. However, it is important to note that the system will operate normally without generating vortex flow (according to the conventional function of cyclone separators) to effect the separation of sand from the liquids and gases. This is advantageous in terms of controlling the process because providing continuous vortex action requires precise control of flow rates and pressures.

Advantageously, the input conduit 102 terminates in an interior flow diverter outlet shaped to promote fanning or spreading of the input stream downward and across the curved interior sidewall of the separator vessel 110.

Figure 6:
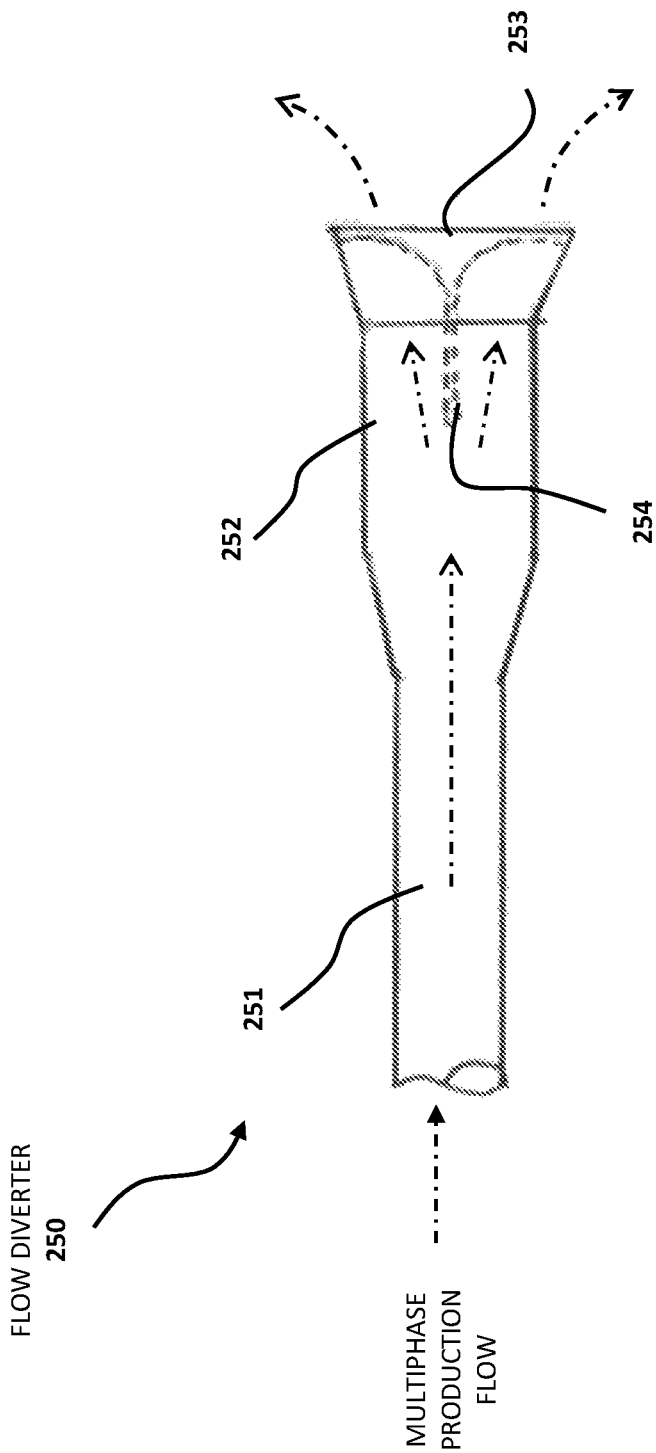
FIG. 6 is a top view of one embodiment of a flow diverter.

One embodiment of a flow diverter 250 is shown a top view in FIG. 6 with the direction of flow indicated by dot-dashed arrows. The flow diverter 250 includes a stem 251 which represents an extension of the conduit carrying the multiphase production flow. Near the outlet of the diverter 250, the stem transitions to a wider diameter portion 252 and terminates in an outlet having an upper hood 253 which is provided to direct the flow generally downwards. A splitter wall 254 is formed in the interior sidewall of the diverter 250 to split the flow. Thus the flow is split and directed downwards in tangential flow against the interior sidewall of the separator vessel. In some embodiments, the stem has an inner diameter of about 3 inches and the wide diameter portion 252 has an inner diameter of about 4 inches. This arrangement causes the flow rate to decrease before it reaches the splitter wall 254. In some embodiments, the splitter wall 254 bisects the wide diameter portion 254. In some embodiments, the splitter wall 254 is a separate component which is insertable into the outlet. In some embodiments the splitter wall 254 is replaceable. In some embodiments, the splitter wall 254 extends into at least about the front half of the wide diameter portion 252 to provide a deep cutting edge which can be eroded by the flow to a significant extent before replacement is required.

Returning now to FIGS. 1-3, fanning or spreading of the flow downward causes the input stream to lose momentum, thereby causing the denser components of sand, water and liquid hydrocarbons to fall towards the bottom of the separator tank 110. Therefore, the primary separation occurring in the separator vessel 110 is separation of gases (including gaseous and volatile hydrocarbons) from the input stream. These gases move out of the separator vessel 110 via conduit 112. The remaining slurry consisting of solids (primarily sand) and liquids including hydrocarbons and water, continues being subjected to swirling within the separator vessel without a vortex effect. The liquids and sand drop out of the separator vessel 110 via conduit 114 driven by the inherent pressure of the input flow (which can be retained and/or modulated by restricting the rate of exit of gases via conduit 112) and move through conduit 114 into the interior of the accumulator vessel 120 which, in this particular embodiment, is a vertical generally cylindrical vessel. Other embodiments may employ differently shaped vessels provided they generally promote settling of sand in the mixture of sand and liquids (including water and liquid hydrocarbons). Advantageously, the accumulator vessel 120 is arranged vertically to provide a significant pressure head of liquid which builds up above the sand accumulating at the bottom of the accumulator vessel 120. This pressure head compresses the accumulated sand to pack it more densely and as a result, liquids (including hydrocarbons and water) entrained in the sand are pushed out of the accumulated sand phase to contribute to additional growth of the pressure head. In fluid mechanics, the term "pressure head" refers to the internal energy of a fluid due to the pressure exerted on its container or on other contents contained within the container.

This particular embodiment of the system 100 includes an additional pressure head element 127 (also referred to as conditioner 127) for increasing the pressure of the liquids against the sand in the accumulator vessel 120. In the illustrated embodiment, the pressure head element 127 is in the form of a conduit having an increased diameter relative to conduit 122 emerging from the top of the accumulator vessel 120 which carries liquids out of the accumulator vessel. Conduit 122 is connected to the bottom of the pressure head element 127 in this embodiment. Alternative embodiments of the pressure head element 127 may have alterative shapes and arrangements to provide the desired effect of increasing the pressure head within the accumulator vessel 120.

The additional pressure head provided by the pressure head element 127 provides the additional effect of minimizing the disruption of fluid above the sand in the accumulator vessel by the slurry stream entering the accumulator vessel 120 via conduit 114 because the additional pressure head will provide a counter-force against the force of the input stream which would otherwise cause resuspension of the sand in the upper liquids and cause problems in the downstream recovery of liquid hydrocarbons.

In this embodiment, conduit 128 emerging from the pressure head element 127, is connected to conduit 112 and the resulting merged conduit 113 then contains water gas, and liquid hydrocarbons substantially free of sand for processing according to conventional methods.

The accumulator vessel 120 may be provided with a sensor (not shown) to measure mass or volume of accumulated sand. In one example, the accumulator vessel 120 includes a load cell to measure the mass of sand accumulating therein. When the load cell detects a pre-determined mass threshold, the detection event will trigger the second phase of process operation as shown in FIG. 2 wherein an operator or an automated system (such as a SCADA system, for example) closes valve 117 in conduit 114 to halt the flow of the slurry from the separator tank 110. In addition, valve 125 in conduit 122 is switched to close flow of liquids out of the accumulator vessel 120 and to vent the pressure within the accumulator tank 120 to a predetermined level appropriate for evacuation of sand from the tank (while these functions are illustrated in relation to a single valve 125, different valves may be provided for these purposes in alternative embodiments). Furthermore, valve 123 in conduit 122 is opened to allow the pressure in the accumulator tank 120 to push the sand out via conduit 122 and send it to the containment vessel 130.

When the evacuation of sand from the accumulator vessel 120 is complete, valves 117 and 125 are switched back to their flow positions and valve 123 is closed. This returns the system to its original state in FIG. 1.

The final phase of operation of the system 100 is shown in FIG. 3, wherein the only change relative to the phase 1 operation is that valve 131 in conduit 132 is opened to allow evacuation of sand from the sand containment vessel for removal from the system and transport away from the system.

In some embodiments, the containment vessel 130 has sufficient volume to store at least five rounds of sand evacuation from the accumulator vessel 120. The volume of one preferred embodiment of the containment vessel 130 is selected to provide sufficient volume to require emptying only once or twice during sand removal operations for an average production well.

Features and Operation of a Second Embodiment of a Sand Separator System

Figure 4:
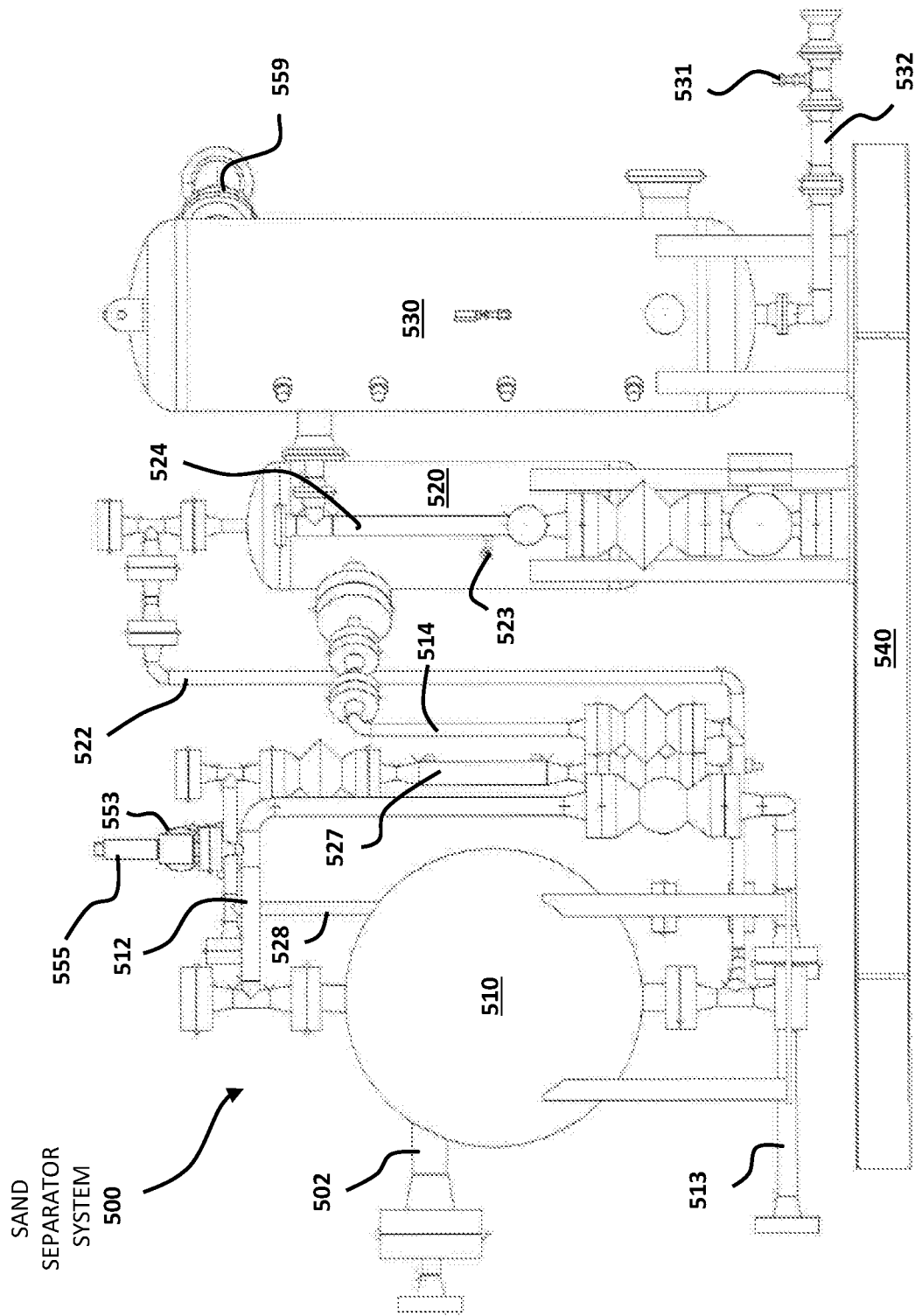
FIG. 4 is a side view of another embodiment of a sand separator system mounted on a transportable platform.
Figure 5:
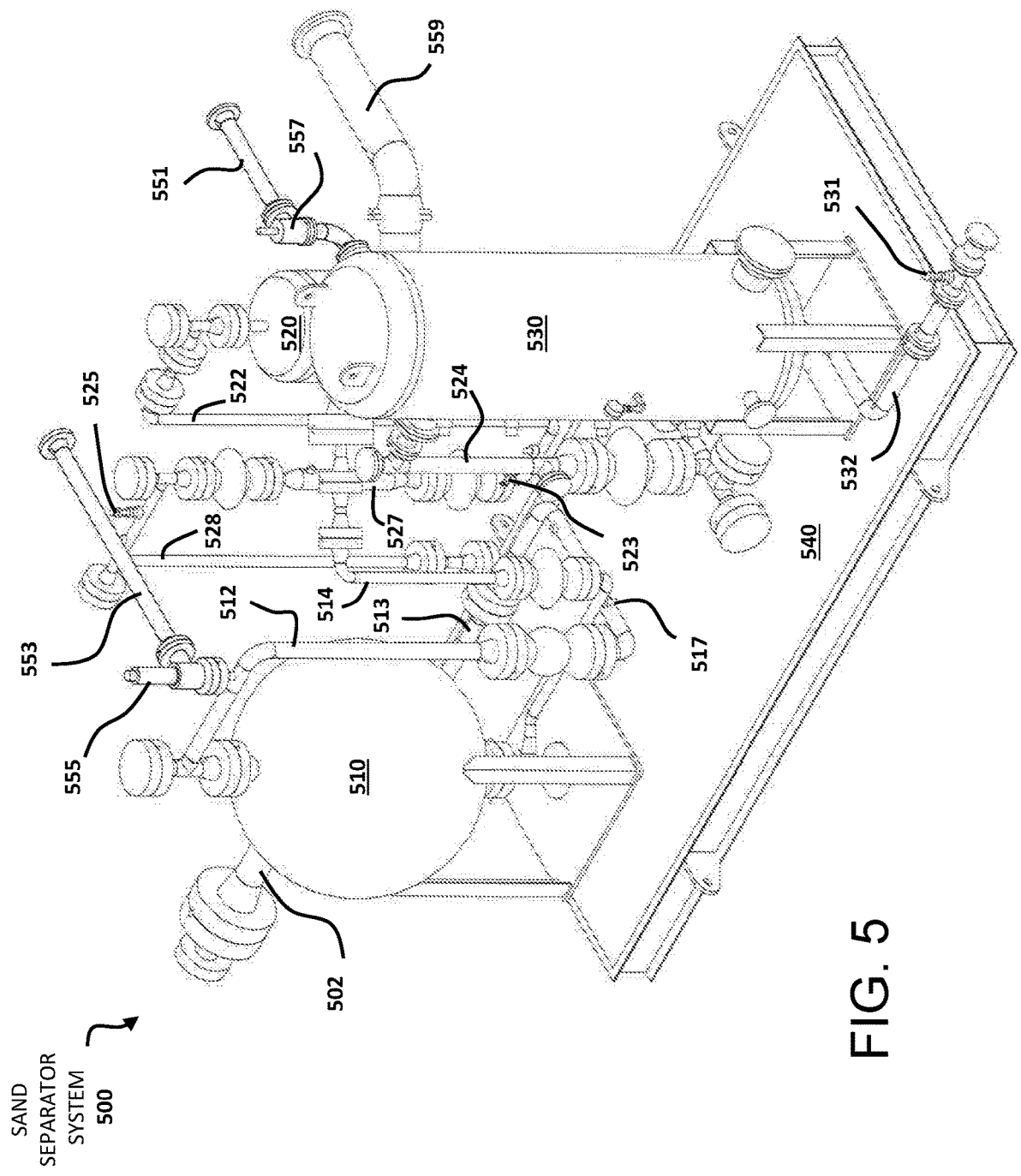
FIG. 5 is a perspective view of the sand separator system of FIG. 4.

Illustrated in FIGS. 4-5 is another embodiment of the sand separator system 500, wherein similar names and reference numerals indicate similar components (for example in system 100, the accumulator vessel is identified with reference numeral 120 and in system 500, the accumulator vessel is identified with reference numeral 520). The components of system embodiment 500 which are similar to those of system embodiment 100 are to be understood to function generally in a similar manner as described for system 100. The reference numerals used in FIGS. 4-5 are listed in Table 2 below.

TABLE 2

Reference Numerals of FIGS. 4-5

| Reference Numeral | Component |
|---|---|
| 500 | System |
| 502 | Conduit: production flow input |
| 510 | Separator vessel |
| 512 | Conduit: from top of separator vessel |
| 513 | Conduit: fluid and gas removal from system |
| 514 | Conduit: separator to accumulator |
| 517 | Valve in conduit 514 |
| 520 | Accumulator vessel |
| 522 | Conduit: Accumulator vessel to pressure head element |
| 523 | Valve in conduit 524 |
| 524 | Conduit: Accumulator to sand containment vessel |
| 525 | Pressure safety valve in conduit 522 |
| 527 | Pressure head element (conditioner) |
| 528 | Conduit: pressure head element to conduit 512 |
| 530 | Sand containment vessel |
| 531 | Valve in conduit 532 |
| 532 | Conduit: sand removal from sand containment vessel |
| 540 | Transportable platform |
| 551 | Conduit: sand containment vessel to gas flare |
| 553 | Conduit: conduit 512 to gas flare |
| 555 | Pressure safety valve in conduit 553 |
| 557 | Pressure safety valve in conduit 551 |
| 559 | Main vent conduit from sand containment vessel 530 |

In this embodiment, the system 500 is mounted on a transportable platform 540, which is commonly known as a "skid." The transportable platform 540 is included in the system 500. The inventors have recognized that the requirement for sand separation operations tends to be temporary in nature and, after an initial production period wherein significant amounts of sand are included in the production stream, sand output becomes reduced to levels which do not cause problems in downstream recovery of hydrocarbons. Thus, system 500 and other embodiments mounted on transportable platforms allow the system to be disconnected from the well and transported for use at another well. The transportable platform 540 can be covered with walls and a roof to form a building providing protection of the system 500 from the elements. Advantageously, the building is heated and includes a door oriented to provide convenient access to all valves and gauges to facilitate their operation, maintenance and repair.

FIGS. 4-5 indicate that system 500 includes additional features which are not present in system 100 of FIGS. 1-3. The sand containment vessel 530 is provided with conduit 551 which is located near the top of the sand containment vessel 530 (best seen in the perspective view of FIG. 5). This conduit 551 has a pressure safety valve 557 which is included to release pressure in case of emergency a connection to a gas flare system (not shown) as a safety feature when the system 500 is used in conjunction with a sour gas well, so that any sour gas which remained entrained in the sand and released when the sand was transferred to the sand containment vessel may be collected and sent to the gas flare system. Likewise, pressure safety valve 555 in conduit 553 is used to send sour gas to the flare system if it is released at an earlier stage and is moving through conduit 512. A large vent conduit 559 is connected to the sand containment vessel 530 and used as a main gas vent system. In this embodiment conduit 559 has an inner diameter of about 8 inches. This conduit is also in communication with the flare system. In practice, the separator vessel 510 and the accumulator vessel 520 would only send gas to flare by way of their respective pressure safety valves 555 and 525 in an emergency, while the sand containment vessel 530 continuously vents gas via conduit 559. In operation the depressurization procedure sends the gas to the sand containment vessel 530. In regular service the venting can go to atmosphere but in sour gas service, venting should be communicated to the flare system.

As used herein, the term "sour gas" refers to any gas containing significant amounts of hydrogen sulfide. For example, natural gas is usually considered sour if there are more than about 5.7 milligrams of hydrogen sulfide per cubic meter of natural gas (approximately 4 ppm per volume under standard temperature and pressure).

In this particular embodiment, all vessels and conduits are rated for containment and transfer of sour gas using materials and/or coatings resistant to hydrogen sulfide.

In this particular embodiment, the sand separator vessel 510 is a spherical tank with an inner diameter of about 48 inches; the accumulator vessel 520 is a cylindrical tank with a length of about 60 inches and an inner diameter of about 24 inches; the pressure head element 527 or conditioner 527 is a pipe about 24 inches long with an inner diameter of about 4 inches and the sand containment vessel is a cylindrical vessel with a length of about 96 inches and an inner diameter of about 36 inches. These dimensions were selected by the inventors subsequent to due consideration of several factors including typical ranges of production flow rates from typical early stage production from a fractured well, typical volumes of sand collected from such wells, the desire to retain the separator vessel 510 at about one third of its volume capacity when the system 500 is at a steady state during operation, the volume of the pressure head element 527 required to provide the desired pressure effect against the sand in accumulation vessel 520, the ability to regulate the pressure to an effective level of between about 10 to about 50 psi for evacuating sand from the accumulation vessel 520 within a period of about five minutes, as well as space considerations for mounting the system on a transportable platform for convenient transport to and integration with an existing well. As such it is believed that the collective dimensions of the main vessels are relevant to certain inventive concepts of this particular embodiment of the invention and not merely simple design choices. However, alternative embodiments focused on different applications or larger scale oilfield systems for separating sand from more than one well at a time may be developed with component dimensions outside of these ranges and with vessels having alternative shapes. These alternative embodiments are also within the scope of the invention.

Advantages

The embodiments of systems and methods described herein provide a number of advantages over conventional sand separator systems. One advantage is that the system operates by conveyance of gases and liquids by forces provided by the production stream itself and as such, energy inputs to operate the system are minimal and relate primarily to ancillary aspects such as automatic valve operation and the like, which are electrically operated. The reduced need for controlling input pressure for the system reduces the requirement for operator input and maintenance. Because the system does not require vortex action (as generated by cyclone separators) to effect separation of sand, it is not sensitive to receiving slugs of liquids from the well. Operation of the system itself produces no greenhouse gas emissions.

As noted above with respect to system 500, certain embodiments are amenable to sour gas production. This is expected to provide significant value for operations in Alberta where at least about 20% of Alberta production is classified as including sour gas.

The embodiments described herein have interconnected features that provide the ability to conveniently collect sand in a containment device and to offload greater volumes sand in a controlled and predictable manner to provide cost savings for sand storage with minimal inclusion of entrained hydrocarbons within the sand.

The example embodiment of the system 500 described hereinabove may offer significant economic benefits over known systems. For example, when configured for a sour gas operation, system 500 may incur expenses about three times less than expenses that may be incurred by a representative commercial embodiment of the system described in US Patent Publication No. 20160375386. In particular, the system of US Patent Publication No. 20160375386 may have additional costs arising in provision of a sand containment tank and associated piping (as required for a sour gas operation), and additional costs associated with transporting the significantly wetter sand away from the site.

Figure 7:
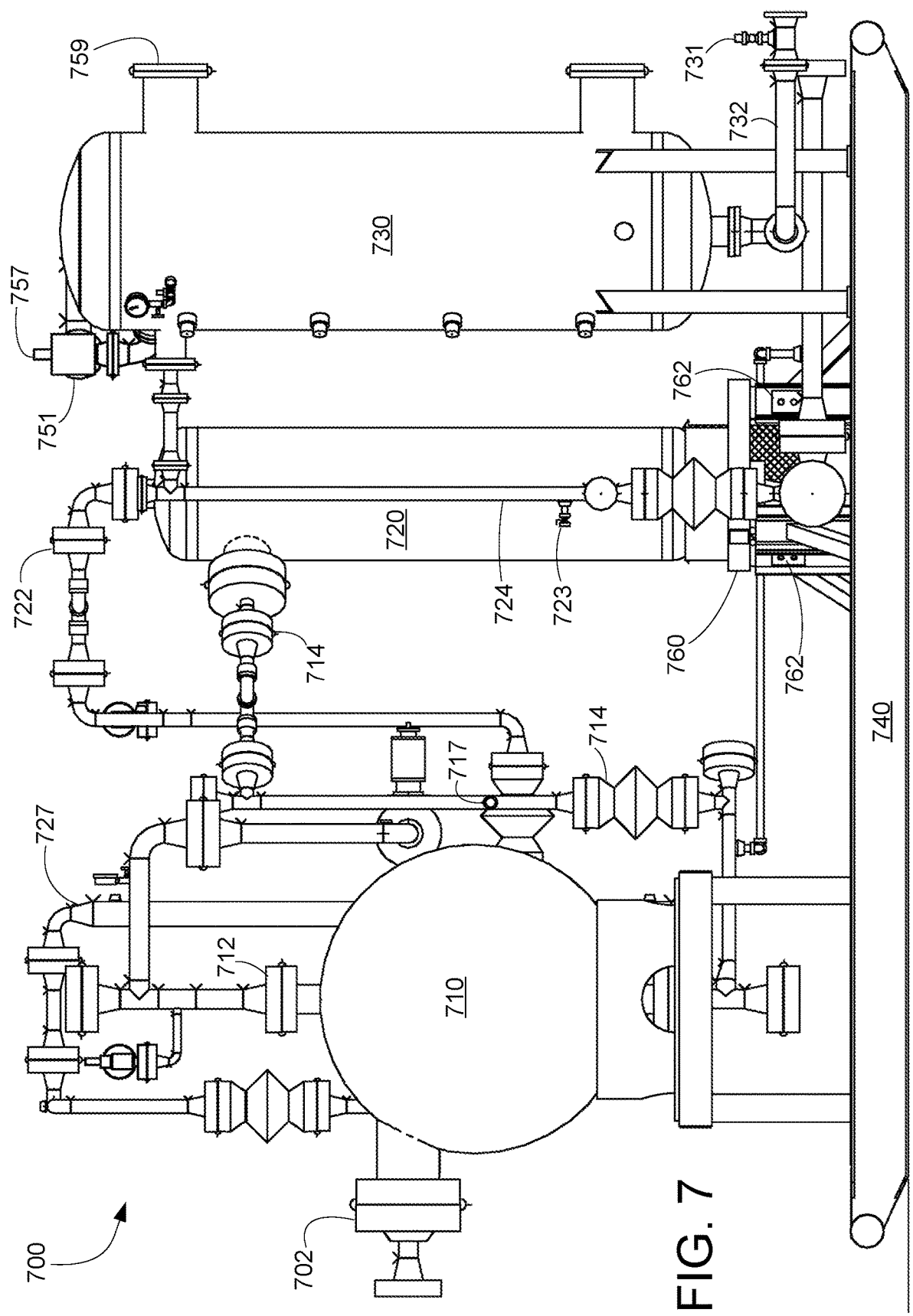
FIG. 7 illustrates a side view of another embodiment of a sand separator system mounted on a transportable platform.
Figure 8:
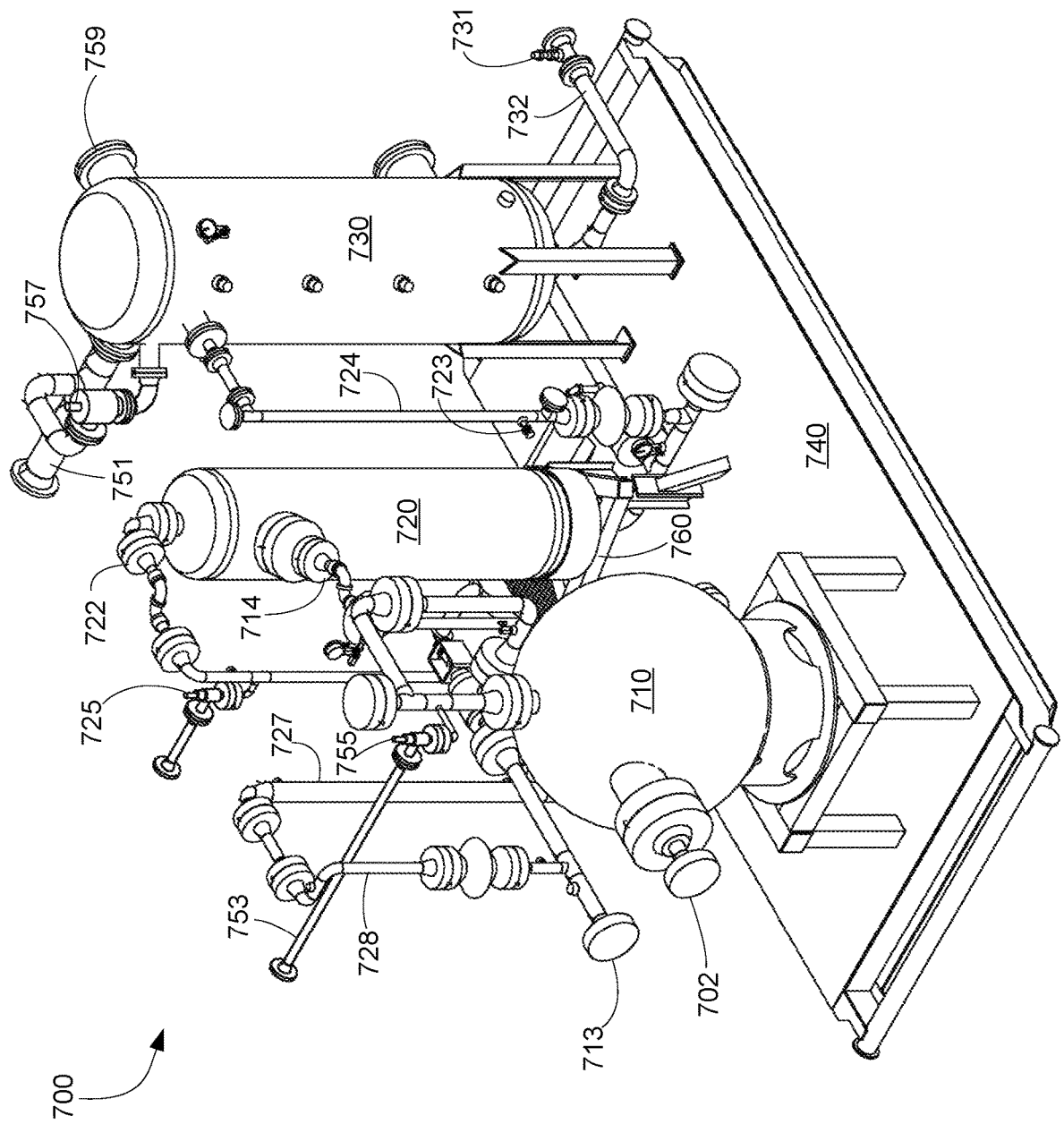
FIG. 8 is a first perspective view of the sand separator system of FIG. 7.
Figure 9:
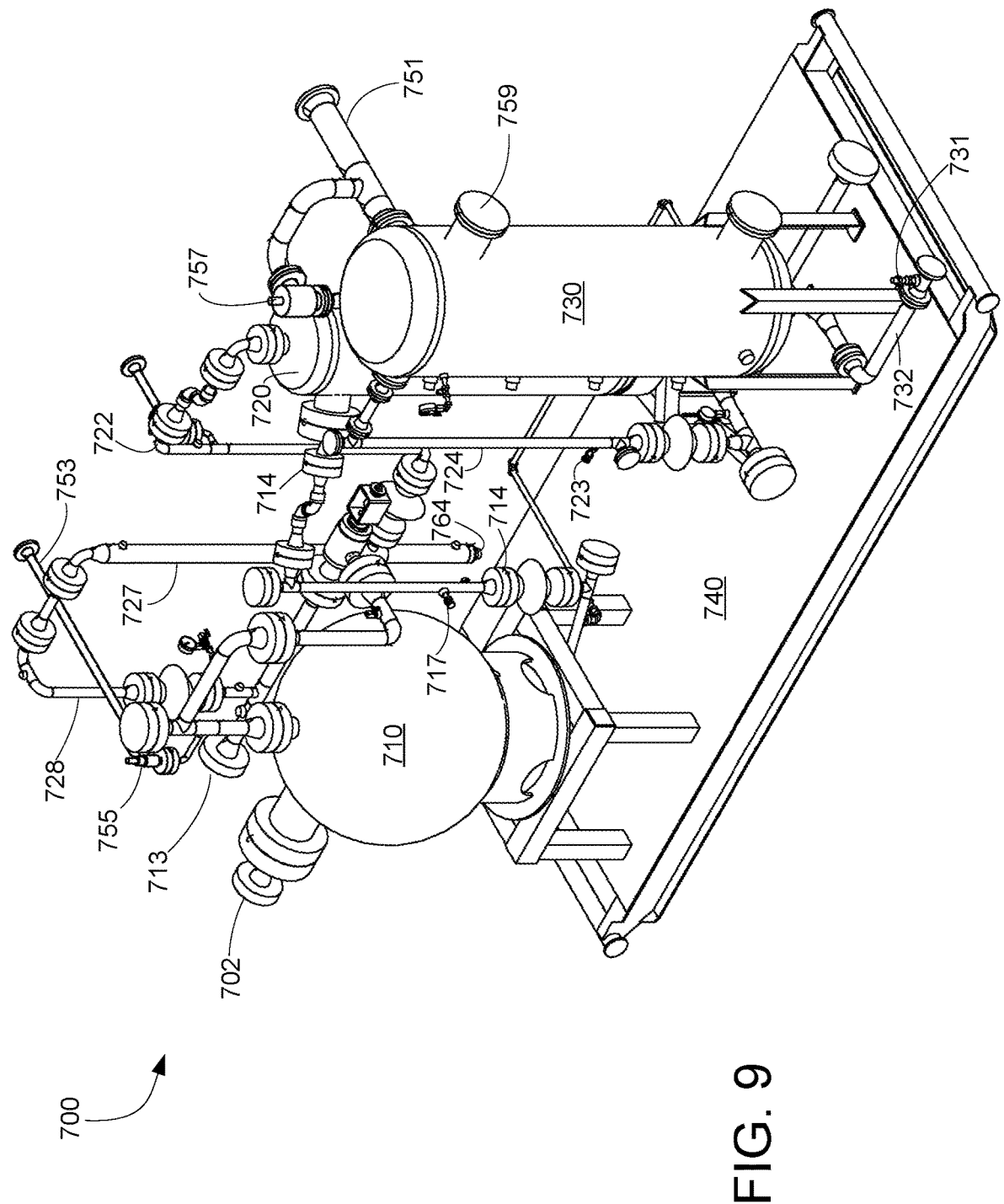
FIG. 9 is a second perspective view of the sand separator system of FIG. 7.

Illustrated in FIGS. 7-9 is another embodiment of the sand separator system 700, wherein similar names and reference numerals indicate similar components (for example in system 100, the accumulator vessel is identified with reference numeral 120 and in system 700, the accumulator vessel is identified with reference numeral 720). The components of system embodiment 700 which are similar to those of system embodiment 100 and/or system embodiment 500 are to be understood to function generally in a similar manner as described for system 100 and/or system 500. The reference numerals used in FIGS. 7-9 are listed in Table 3 below.

TABLE 3

Reference Numerals of FIGS. 7-9

| Reference Numeral | Component |
| --- | --- |
| 700 | System |
| 702 | Conduit: production flow input |
| 710 | Separator vessel |
| 712 | Conduit: from top of separator vessel |
| 713 | Conduit: fluid and gas removal from system |
| 714 | Conduit: separator to accumulator |
| 717 | Valve in conduit 714 |
| 720 | Accumulator vessel |
| 722 | Conduit: Accumulator vessel to pressure head element |
| 723 | Valve in conduit 724 |
| 724 | Conduit: Accumulator to sand containment vessel |
| 725 | Pressure safety valve in conduit 722 |
| 727 | Pressure head element (conditioner) |
| 728 | Conduit: pressure head element to conduit 712 |
| 730 | Sand containment vessel |
| 731 | Valve in conduit 732 |
| 732 | Conduit: sand removal from sand containment vessel |
| 740 | Transportable platform |
| 751 | Conduit: sand containment vessel to gas flare |
| 753 | Conduit: conduit 712 to gas flare |
| 755 | Pressure safety valve in conduit 753 |
| 757 | Pressure safety valve in conduit 551 |
| 759 | Main vent conduit from sand containment vessel 530 |
| 760 | Platform frame upon which accumulator is mounted |
| 762 | Load sensor leg |
| 764 | Sampling port at bottom of pressure head element (conditioner) 727 |

In this embodiment, the system 700 is again mounted on a transportable platform 740 commonly known as a "skid." FIG. 7 illustrates a side view of the system 700, FIG. 8 is a first perspective view of the sand separator system 700 of FIG. 7, and FIG. 9 is a second perspective view of the sand separator system 700 of FIG. 7.

As illustrated, the pressure head element 727 (i.e., conditioner) 727 is implemented as a tall piece of pipe that extends above a highest point of the accumulator vessel 720. As described in Pascal's law, a pressure change at any point in a confined incompressible fluid is transmitted throughout the fluid such that the same change occurs everywhere. Thus, when the conditioner 727 and the accumulator along with the conduit 722 interconnecting the two are filled with fluid such as water, the pressure exerted by the water within the conditioner 727 that is above the height of the accumulator vessel 720 creates pressure on the fluid within the accumulator 720. In other words, the conditioner 727 effectively extends the height of the accumulator vessel 720 in terms of pressure head. Beneficially, the accumulator vessel can be reduced in size thereby lowering its cost. Being a narrower pressure vessel, the pipe utilized to form the conditioner 727 is typically cheaper at a given pressure requirement than the accumulator vessel 720 and a cost of the vessels 720, 727 is therefore reduced compared with just having a larger accumulator vessel 720.

Furthermore, during the second phase of operations when the accumulator 720 is isolated from the conditioner 727 such as by closing a valve in conduit 722 (shown in FIGS. 1-3 as valve 125, for example), the fluid within the conditioner 727 is no longer affecting or part of the material within the accumulator vessel 720. Beneficially, this means the fluid within the conditioner 727 is not passed from the accumulator 720 to the sand containment vessel 730 for unnecessary storage. The sand containment vessel 730 may therefore be almost entirely filled with sand and have very little water content. This is beneficial to reduce the number of times the sand containment vessel 730 needs to be emptied. In other words, having the conditioner element 727 as a separate pressure head vessel 727 that can be disconnected from the accumulator 720 reduces the amount of water and other fluids that is passed to the sand containment vessel 730 thereby increasing the time durations between needing to empty the sand containment vessel.

The material removed from the sand containment vessel 730 typically needs to be pumped into trucks for transport to other locations. Thus, reducing the amount of water within the sand containment vessel 730 is further beneficial to reduce the amount of material that needs to be transported further lowering costs.

The conduit 722 that connects the accumulator vessel 720 and the conditioner 727 connects to the conditioner at a vertical position about halfway up the height of the conditioner 727. In this way, any sand that remains in the fluid within the conditioner can fall to a bottom section of the conditioner 727 without clogging the conduit 722. At a bottom of the conditioner 727, sampling port 764 allows operators to check for and remove any sand accumulating within the conditioner 727.

Figure 10:
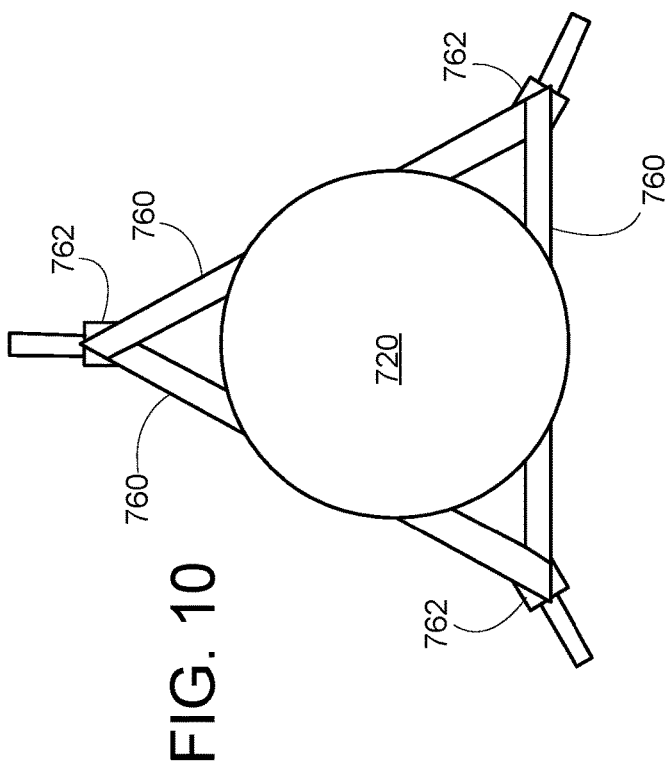
FIG. 10 illustrates a top-down view of a load measurement system for the accumulator vessel according to an exemplary embodiment.

FIG. 10 illustrates a top-down view of a load measurement system for the accumulator vessel 720 according to an exemplary embodiment. The accumulator vessel 720 is mounted and sits on a triangular platform 760 formed by three steel beams forming a triangular frame. A load sensor leg 762 is positioned under each of the three points of the triangular platform 760. The triangular-shaped platform 760 and three corresponding load sensor legs 762 beneficially allow for easy balancing and leveling of the accumulator vessel 720 such that each load sensor leg 762 receives one-third of the weight of the sand containment vessel 720. However, similar to a camera tripod, having three legs 760 beneficially divides the load in a stable manner regardless of whether perfect load division is achieved. In other words, each load sensor leg 760 feels mass from the accumulator 720 even if a level balance and equal division of the mass is not ideally achieved.

Figure 11:
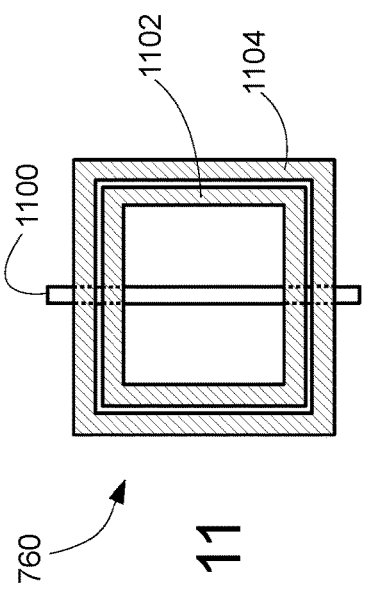
FIG. 11 illustrates a cross-sectional top view of a load sensor leg having a pin sensor according to an exemplary embodiment.

FIG. 11 illustrates a cross-sectional top view of a load sensor leg 760 having a pin sensor 1100 according to an exemplary embodiment. The load sensor leg 760 in this embodiment is formed by a square foot portion 1102 that fits inside and slides up and down within a shoe portion 1104. The foot portion 1102 in this embodiment is connected to the platform 760 and the shoe portion 1104 is connected to the skid base 740. The pin sensor 1100 is inserted through holes in order to traverse across the foot and shoe portions 1102, 1104. The weight of the accumulator vessel 720 pushes downward on the foot portion 1102, which is held upward against the force of gravity by the pin 1100 being held in position by the shoe portion 1104. The sensor pin 1100 is a piezoelectric sensor that measures load given the flex and compression of the pin 110 between the foot and shoe portions 1102, 1004.

Figure 12:
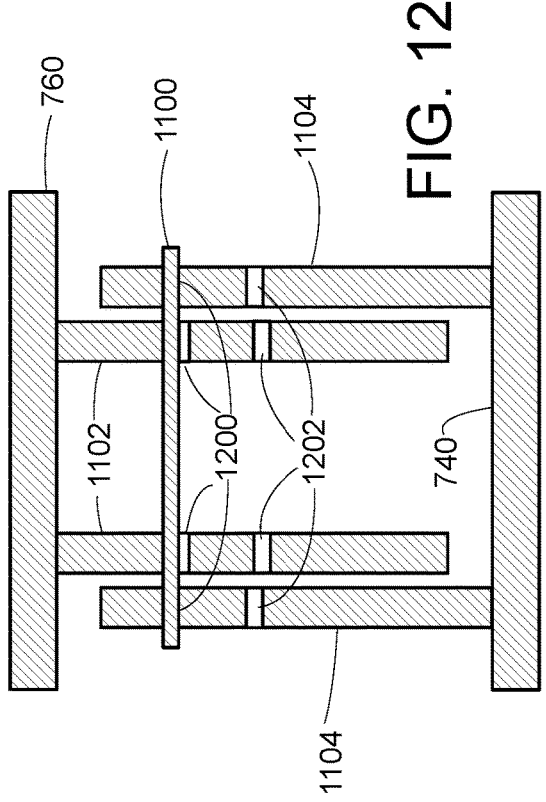
FIG. 12 illustrates a first cross-sectional side view of the load sensor leg with pin sensor of FIG. 11 configured in a measurement mode according to an exemplary embodiment.

FIG. 12 illustrates a first cross-sectional side view of the load sensor leg 762 with pin sensor 1100 of FIG. 11 configured in a measurement mode according to an exemplary embodiment. In the measurement mode, the sensor pin 1100 is installed via a first hole 1200 installed across the foot and shoe portions 1102, 1104. As illustrated, the first hole 1200 as drilled through the foot portion 1102 is larger than as drilled though the shoe portion 1104 such that there is a slight gap under the sensor pin 110 in the measurement mode. While in the measurement mode, the foot portion 1102 slides downward relative to the shoe portion 1104 so that the top edge of the hole 1200 of the foot portion 1102 presses against the sensor pin 1100. The sensor pin 1100 is coupled to one or more processors 1900 (see FIG. 19) for measuring the sand load (i.e., mass) of the sand accumulator 720 mounted on platform 760. A second hole 1202 mounted through the shoe and foot portions 1102, 1104 is unused while the sensor foot 762 is in the measurement mode.

Figure 13:
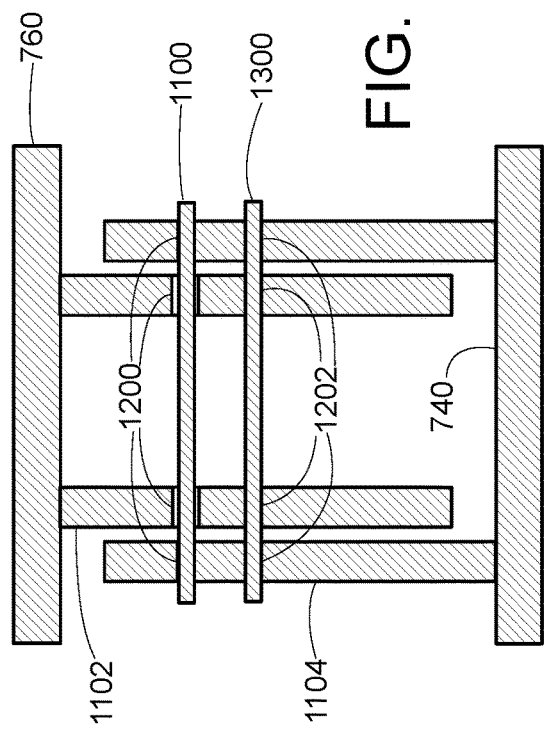
FIG. 13 illustrates a second cross-sectional side view of the load sensor leg with pin sensor of FIG. 11 configured in a transportation mode according to an exemplary embodiment.

FIG. 13 illustrates a second cross-sectional side view of the load sensor leg 762 with pin sensor 1100 of FIG. 11 configured in a transportation mode according to an exemplary embodiment. In the transportation mode, one or more hydraulic jacks 1510 (see FIG. 15) are used to raise the platform 760 up such that the second hole 1202 aligns across the foot and shoe portions 1102, 1104 and a transport pin 1300 can be inserted therethrough. The transport pin 1300 is a strong steel pin in this embodiment and is not a sensor pin. The transport pin 1300 is inserted to bear the weight of the platform 760 and accumulator vessel 720 during transport of the skid 740 to new locations where the system 700 is to be deployed.

Many of the roads that need to be travelled to oil and gas wells are bumpy and the sensor pin 1100 may be damaged during transport if it were supporting the platform 760 weight. To protect against this, the platform 760 is raised slightly such that the first hole 1200 through the foot portion 1102 has a slight gap both above and below the sensor pin 1100. The amount that the platform 760/foot portion 1102 is raised matches the required distance such that second hole 1202 aligns perfectly across the shoe and foot portions 1102, 1004 and the second pin 1300 is inserted. During the transport mode while the transport pin 1300 is inserted, the foot portion 1102 and shoe portion 1104 are locked in position relative to one another and there are no excessive forces exerted on the sensor pin 1100 even if large bumps are incurred during transport. Upon arrival, the sensor leg 762 can be converted back to the measurement mode by removing the transport pin 1300.

Figure 14:
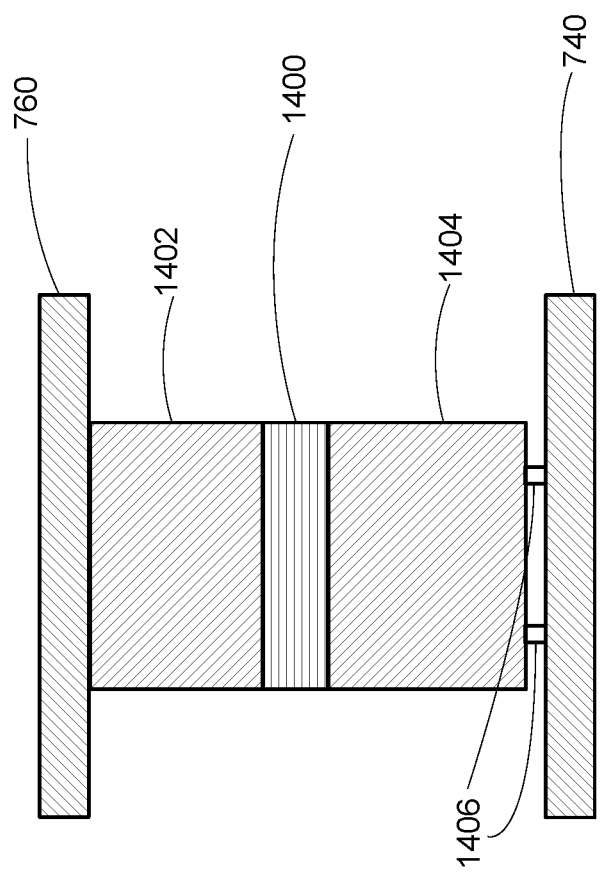
FIG. 14 illustrates a load sensor leg utilizing a load cell according to an exemplary embodiment.

Other types of load sensor legs 762 may also be utilized in other embodiments. FIG. 14 illustrates a load sensor leg 762 utilizing a load cell 1400 according to an exemplary embodiment. Rather than utilizing a sensor pin 1100 as illustrated above, in this embodiment, the load cell 1400 is sandwiched between two leg portions 1402, 1404 and measures the forces therebetween according to the pressure felt by the load cell 1400. One or more adjusting screws 1406 allow for adjusting the height of the load sensor leg 762 to adjust leveling of the platform 760 in conjunction with the other two legs 762.

Load cells, also referred to as weigh modules, are known in the art. For instance, Mettler Toledo's model number SWB805 is a multi-mount weigh module for food and pharmaceutical applications that can also be utilized as the load cell 1400 in each load sensor leg 762 in some embodiments. Beneficially, different commercial weigh modules include safety and locking mechanisms that can be engaged during transport of skid 740 to avoid damage to internal pressure sensors during transport. Alternatively, a foot and shoe 1102, 1104 design similar with a transport pin 1300 as illustrated above can be utilized in conjunction with a load cell 1400 to protect the load cell 1400 during transport in a similar manner as described above to protect the sensor pin 1100.

Figure 15:
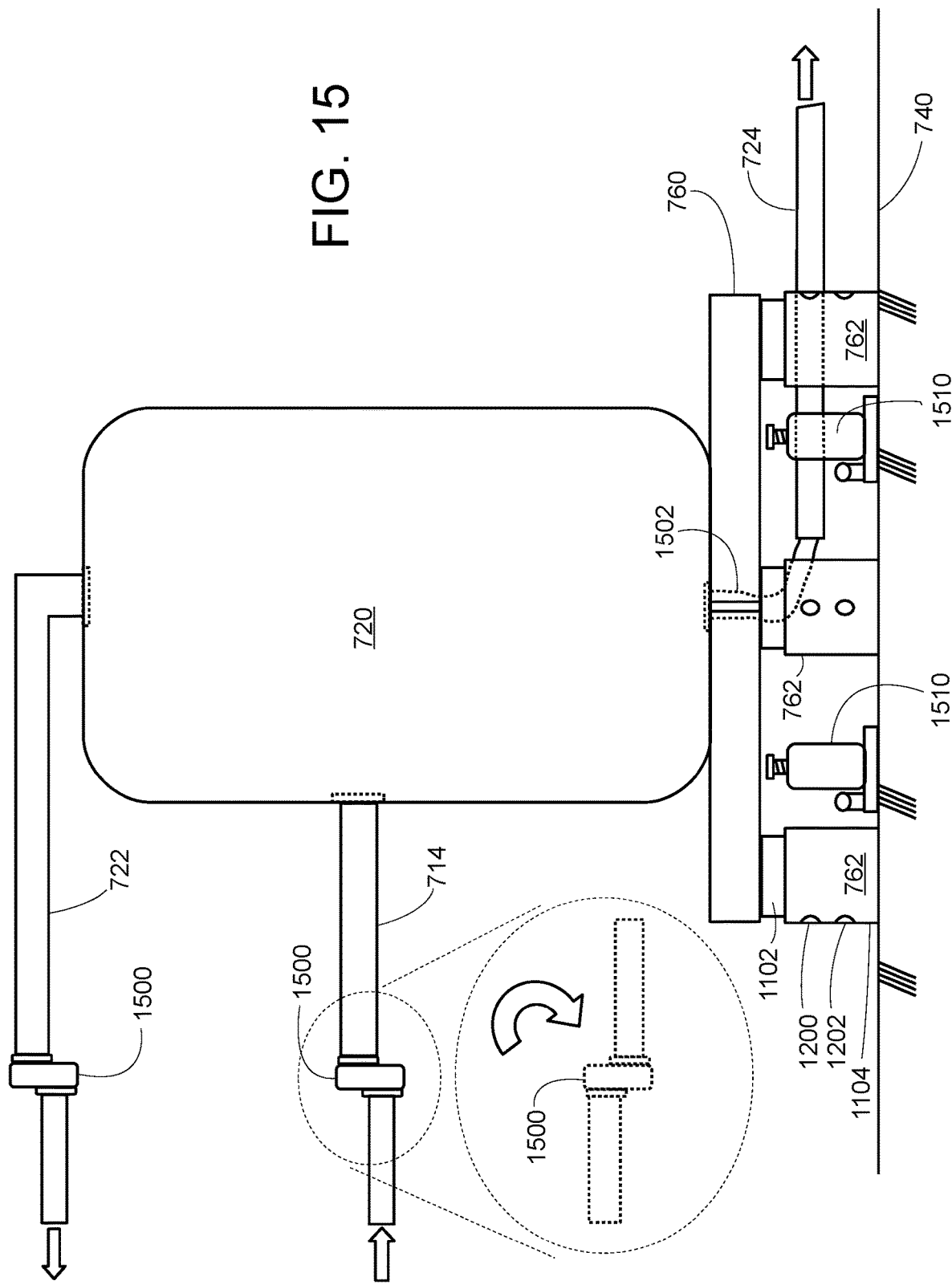
FIG. 15 illustrates a side view of the accumulator vessel on the platform with swivel joints to facilitate sand weight measurement according to an exemplary embodiment.

FIG. 15 illustrates a side view of the accumulator vessel 720 on the platform 760 with swivel joints 1500 to facilitate sand weight measurement according to an exemplary embodiment. To accurately measure changes in the weight of the accumulator 720 due to sand accumulation, the accumulator 720 and its base platform 760 are beneficially configured in this embodiment to be vertically moveable in order to enable compression of the three load sensor legs 762 depending on the weight of the accumulator 720.

There are three connection conduits to and from the accumulator vessel 720 in some embodiments:
1) conduit 714 from the separator vessel 710 to the accumulator vessel 720,
2) conduit 722 from the accumulator 720 to the pressure head element (conditioner) 727, and
3) conduit 724 from the accumulator 720 to the sand containment vessel 730.

Conduits 714 and 722 are high pressure conduits and need, in some embodiments, to withstand pressure of the order of 5000 psi. To prevent these rigid conduits 714, 722 from essentially supporting the weight of (i.e., holding up) the accumulator vessel 720, swivel joints 1500 are installed in each conduit 714, 722 near the accumulator 720. As illustrated in the swivel joint feature view 1510, the joint 1500 can swivel to allow a vertical range of motion of the accumulator 720. In this way, the swivel joints 1500 help ensure that most of the weight of the accumulator 720 is actually being felt by the load sensor legs 762.

Conduit 724 is not a high pressure conduit as it merely utilized to transfer sand from the accumulator 720 to the sand containment vessel 730 when the accumulator 720 has been isolated from the rest of the system 700. For this reason, a braided hose 1502 is utilized to connect the accumulator vessel 720 to conduit 724. The flexible nature of the braided hose 1502 allows the vertical range of motion of the accumulator 720 and helps to ensure that conduit 724 does not support the weight of the accumulator vessel 720. Other types of flexible hoses or pipes may be utilized in other embodiments instead of braided hose.

Three hydraulic jacks 1510, one adjacent each load sensor foot 762, are utilized to raise the platform 760 and thereby raising each of the shoe portions 1102 from the foot portions 1104 in order to align the second hole 1200 and insert the transport pin 1300. During the measurement mode, the hydraulic jacks 1510 are unused and can be either lowered as illustrated in FIG. 15 or removed entirely.

Figure 16:
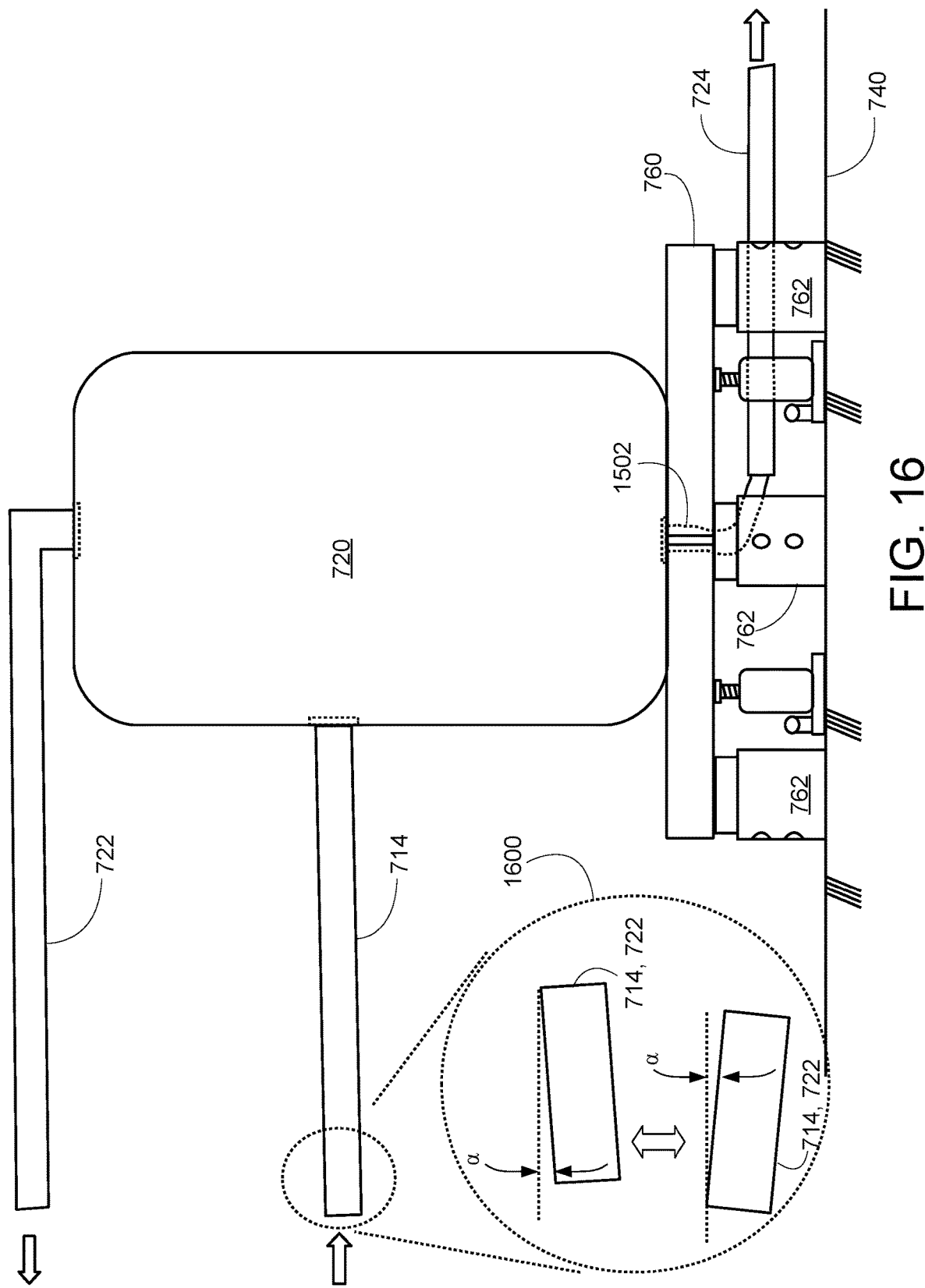
FIG. 16 illustrates a side view of the accumulator vessel on the platform with flexing horizontal pipes to facilitate sand weight measurement according to an exemplary embodiment.

FIG. 16 illustrates a side view of the accumulator vessel 720 on the platform 760 with flexing horizontal pipes 714, 722 to facilitate sand weight measurement according to an exemplary embodiment. In this embodiment, the swivel joins 1500 in conduits 714, 722 are removed; however, these conduits 714, 722 are configured to run in a horizontal direction with a length sufficient such that they allow the accumulator vessel 720 to change its vertical position within a few centimeters to ensure the sand weight is felt by the load sensor legs 762. All horizontally run pipes will have some flex and this is designated by the angle $\alpha$ in FIG. 16. As illustrated in the feature flex joint feature view 1600, the conduit 714, 722 flexing by the angle $\alpha$ from the horizontal will cause end of the conduit 714, 722 that attached to the accumulator vessel 720 to be movable up and down by a certain distance. Given the tolerances of actual pipes and pipe joints used in the implementation, a safe angle $\alpha$ can be determined. Given angle $\alpha$ and a desired vertical displacement range for the accumulator 720 such as two to five centimeters, the required length of the conduits 714, 722 can determined using the well-known trig formulas for right angled triangles. For instance, the minimum required length of the conduits 714, 722 in some embodiments is equal to the desired vertical displacement divided by $\sin(\alpha)$. In some embodiments, the conduits 714, 722 should be run at least in the range of 2-3 meters in order to allow sufficient flex to achieve a few centimeters of vertical play of the accumulator without risk of pipe joint failure.

Figure 17:
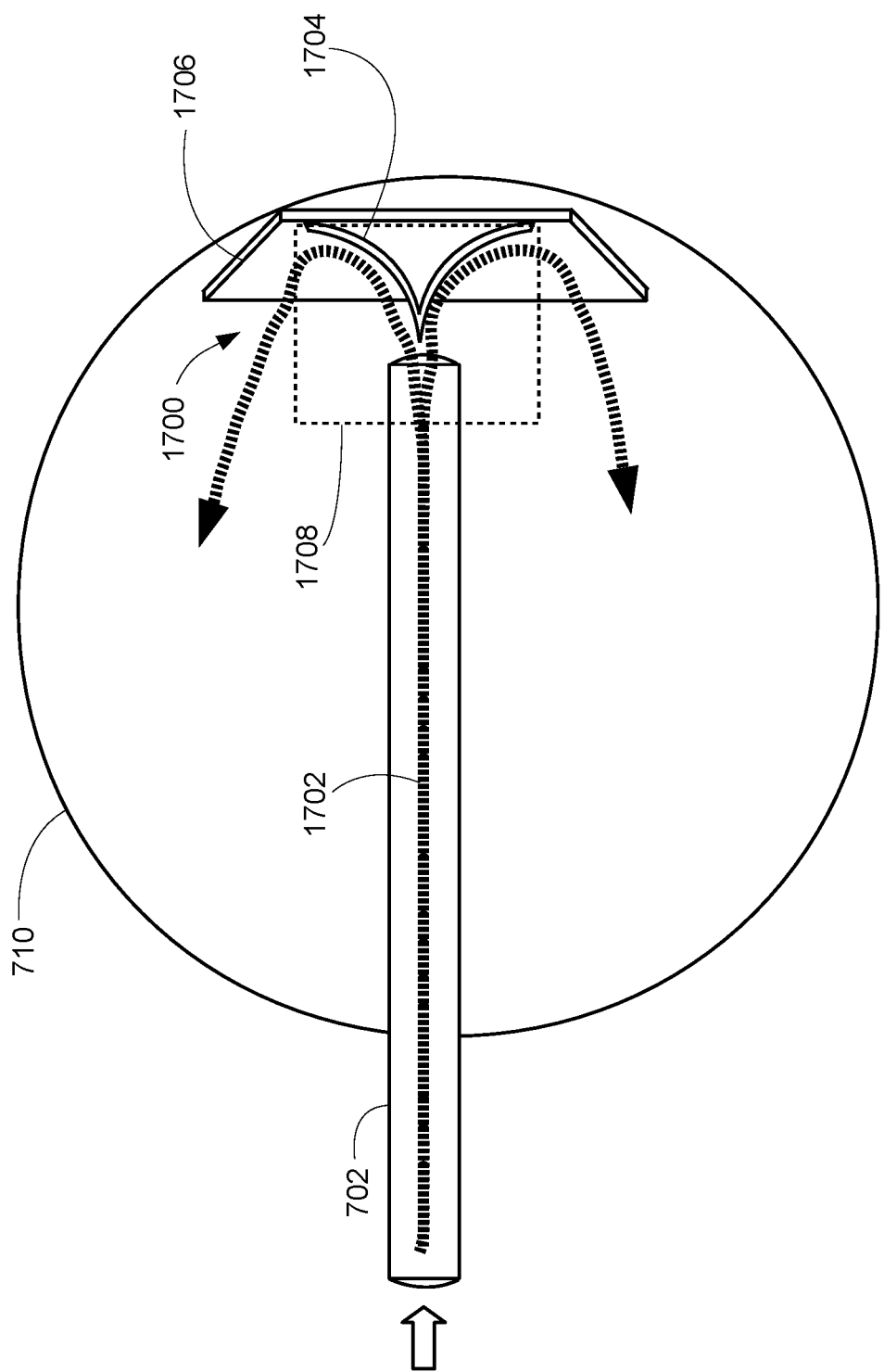
FIG. 17 illustrates a top-down view of a two-stage active flow diverter for assisting separating sand from production flow within the separator vessel according to an exemplary embodiment.

FIG. 17 illustrates a top-down view of a two-stage active flow diverter 1700 for assisting separating sand from production flow 1702 within the separator vessel 710 according to an exemplary embodiment. The conduit 702 carrying production flow 1702 from the well terminates within the spherical separator vessel 710 at a splitter wall 1704. The splitter wall 1704 splits the flow 1702 into two streams which are directed downwards in tangential flow against a backplate 1706. The backplate 1706 is angled such that the two streams of flow 1702 are directed downwards in tangential flow against the interior sidewall of the separator vessel in two different directions. An upper hood plate 1708 blocks the flow 1702 from being directed in the upwards direction.

Figure 18:
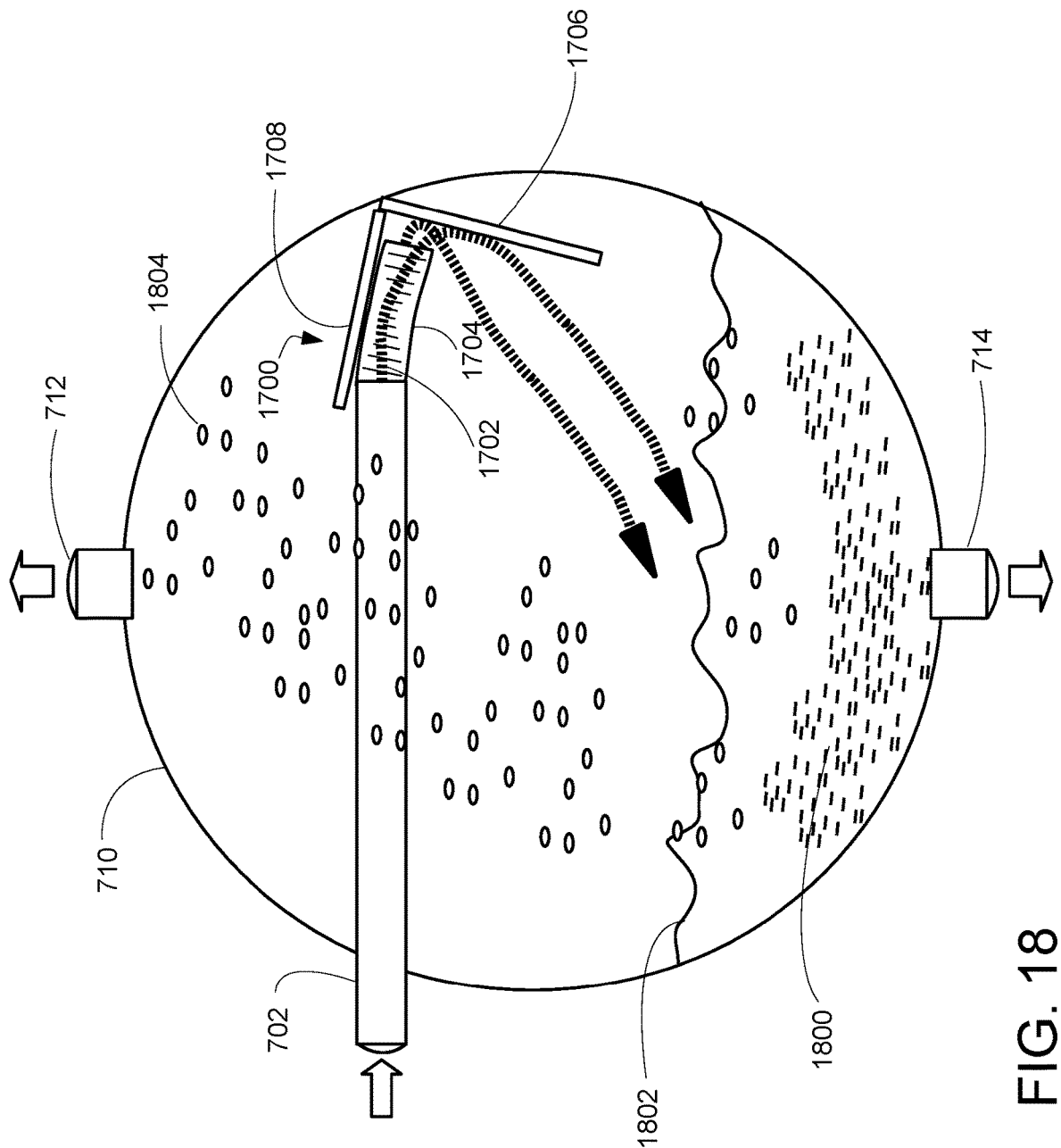
FIG. 18 illustrates a side view of the two-stage active flow diverter of FIG. 17.

FIG. 18 illustrates a side view of the two-stage active flow diverter 1700 of FIG. 17. As illustrated, the conduit 702 providing the production flow 1702 enters the separator vessel 710 at about two-thirds the height of the separator vessel 710 (i.e., enters within the upper portion of separator vessel 710). The conduits 702 terminates at the flow diverter 1700 where the splitter wall 1704 divides the flow 1702 into two streams in a slight downward direction. The upper hood plate 1708 is angled downwards and blocks and directs the divided flow 1702 in the downward direction. The divided flow 1702 impacts the backplate 1706 and is thereby slowed in speed and directed tangentially around the interior sidewalls of the separator vessel 710. The backplate 1706 is replaceable in this embodiment and helps to protect the more expensive separator vessel 710 from damage. Over time, the various components 1704, 1706, 1708 of the flow diverter 1700 may be worn away from sand impact and each of the components 1704, 1706, 1708 are replaceable in this embodiment.

In operations, production flow 1702 is slowed and diverted into multiple streams away from the conduit 712 at the top of the separator vessel. Sand 1800 and water 1802 accumulates on the bottom of the separator vessel for transfer to the accumulator vessel 720 via conduit 714. Gases and other hydrocarbons 1804 rise to the top of the accumulator vessel 720 and exit via conduit 712.

Figure 19:
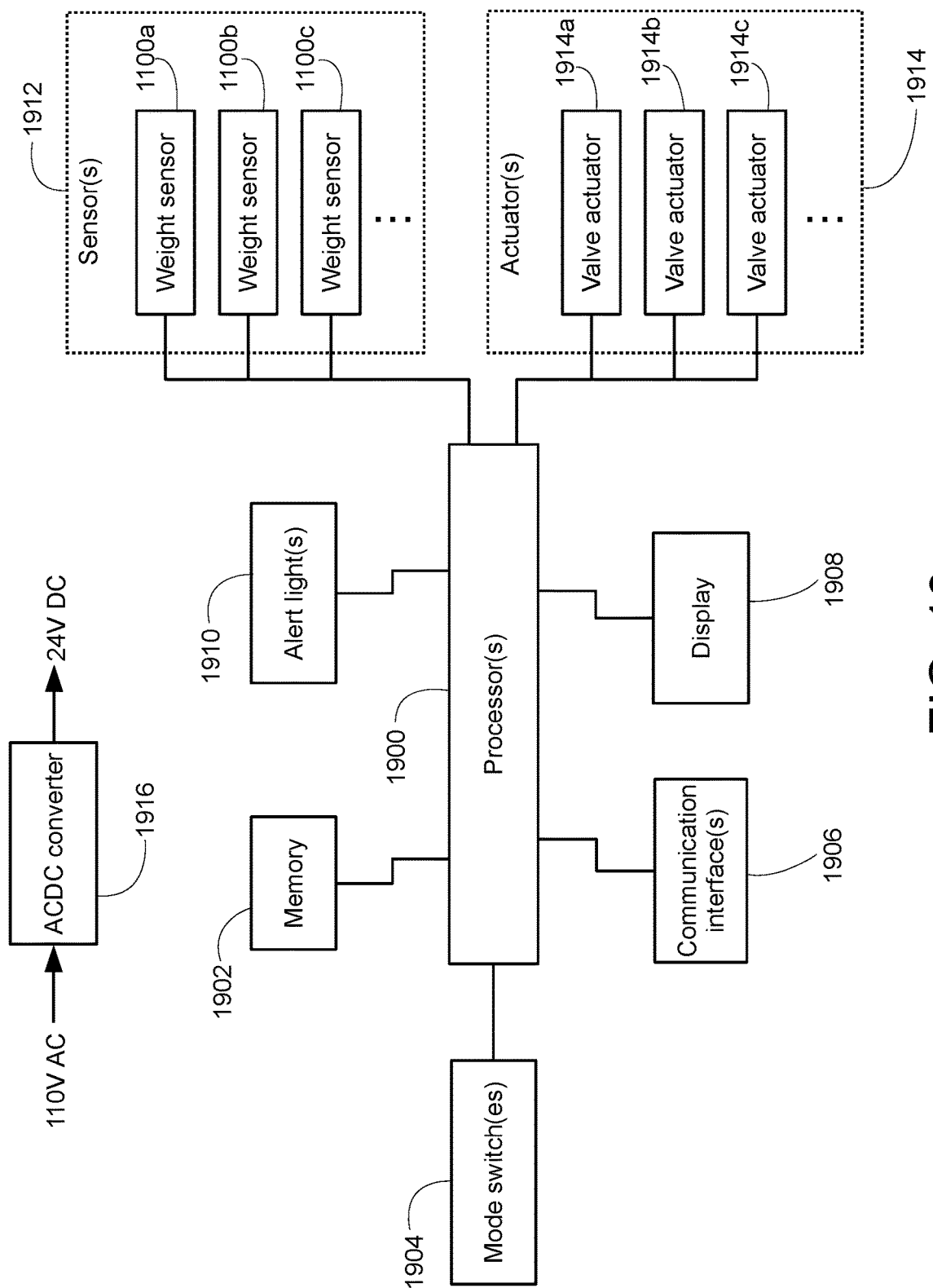
FIG. 19 illustrates a block diagram of electrical components of the system of FIG. 7 according to an exemplary embodiment.

FIG. 19 illustrates a block diagram of electrical components of the system 700 of FIG. 7 according to an exemplary embodiment. In this embodiment, the system 700 includes one or more processors 1900 coupled to memory 1902 such as FLASH memory, magnetic storage, and/or dynamic random access memory (DRAM), for instance.

The one or more processors 1900 may be included in a central processor unit (CPU) of a computer acting as a valve control system and/or other controller in the system 700. In the following description the plural form of the word "processors" will be utilized as it is common for a CPU of a computer server or embedded device to have multiple processors 1900 (sometimes also referred to as cores); however, it is to be understood that a single processor 1900 may also be configured to perform the described functionality in other implementations.

One or more mode switches 1904, communication interfaces 1906, displays 1908, and alert lights 1910 are coupled to the processors 1900. Likewise, the system 700 includes a plurality of accumulator vessel 710 weight sensors 1912 and a plurality of valve actuators 1914, all also coupled to the processors 1900. An alternating current (AC) to direct current (DC) power converter 1916 provides electrical power to the processors 1900 and other electrical components illustrated in FIG. 19.

Taking the embodiment of FIGS. 11-13 where the load sensor legs 762 utilize a sensor pin 1100 as an example, each of the weight sensors 1912 in FIG. 19 corresponds to one of the load sensor pins 1100. (These sensors 1912 could also correspond to the load cells 1400 in other embodiments.) Since there are three legs 762 in this embodiments, there are three load sensor pins 1100a, 1100b, 1100c. The processors receive sensor signals from these three sensors 1100a, 1100b, 1100c and convert their values into a weight measurement of the sand portion of the accumulator 710. In some embodiments, a calibration operation is performed by the processors 1900 when the accumulator is full of water but not sand. Sand is known to weigh 2.2 to 2.5 times the weight of water. When the accumulator is empty of sand but full of water, the processors 1900 can store weight measurement values from the three weight sensors 1912 as a zero value. Thereafter, as the weight of the accumulator 710 increases according to the weight sensor 1912 measurements, the increased weight is known to be due to sand accumulating within the accumulator vessel 720. To calculate the full weight of the accumulator 720 during the measurement mode, the processors 1900 may sum the weight values as measured by each of the weight sensors 1912 to arrive at the total weight.

A threshold weight is stored in the memory 1902 and represents a weight of the accumulator vessel 720 when loaded to a predetermined threshold amount of sand such as 90% full. Once the total weight of the accumulator 710 as measured by the weight sensors 1912 and summed by the processors 1900 reaches this threshold, the processors 1900 activate the alert lights 1910. In some embodiments, the alert lights 1910 are flashing lights such as a flashing red light mounted on an exterior location such as above the accumulator 720 or storage tank 730 to be visible by users from a distance. When the lights 1910 are flashing, the users thereby know that the accumulator vessel 720 should have its contents transferred to the storage vessel 730.

The mode switches 1904 allow human operators of system 700 to place the system 700 into different modes such as measurement modes and different phases such as to toggle valve positions for the first, second, and third phases illustrated in FIGS. 1-3. In some embodiments, the valves 117, 125, 123 are each both manually and automatically adjustable between closed and open positions. Manual operation is achieved by an operator physically turning the valve between the open/closed positions. Likewise, automatic operation is controlled by the processors 1900 sending commands to the valve actuators 1914, where each controllable valve 117, 125, 123 has a corresponding valve actuator 1914a, 1914b, 1914c, respectively. The processor 1900 may send commands to valve actuators 1914 as a result of mode switches 1904 be adjusted by a user and/or as a result of automatic processing by the processors 1900 such as in response to detecting the threshold weight requiring sand transfer from accumulator 720 to storage vessel 730. Although, only three valves 117, 125, 123 are shown in system 100 and three corresponding valve actuators 1914a, 1914b, 1914c, different numbers of valves and actuators may be utilized in other embodiments.

In some embodiments, during measurement mode the processors 1900 further transmit information corresponding to the measured weight of sand in the accumulator 720 to one or more external systems via communication interfaces 1906. Examples of communication interfaces 1906 include wired and wireless interfaces connected to externally managed supervisory control and data acquisition (SCADA) systems. Automated alters may be sent by the processors 1900, for example, upon the threshold sand weight being reached or upon any desired, user-configurable amount or other threshold. In this way, in addition to the visual signal provided by the alert lights 1910, remote alerts such as emails, simple message service (SMS) messages, push notification messages, etc. may be sent to specifically addressed individuals such as to the mobile phone of a particular operator responsible for maintaining the system 700.

In some embodiments, the processors 1900 continually update the display 1908 and/or external SCADA (or other types of systems) with the current weight of sand in the accumulator 720. In other words, besides removing the sand and other particular matter from the product flow 1702, the system 700 may also be utilized to dynamically in real-time measure the sand and other particulate content of flow during various well operations. For instance, sand may be removed and measured in real time during production as described above in an exemplary application. However, sand may also be removed and measured during the fracturing process or any other phase of drilling, completing, and/or production of the well. During a particular phase drilling, completing, and/or production, fluid returned from downhole can be run through the system 700, and the processors 1900 dynamically measure/calculate the weight of sand in the accumulator 710. This information can be provided to operators at the well site or elsewhere via the onboard display and communication interfaces for remote transmission of the sand volume information.

In just one example use-case scenario, a first test may be run where system 700 removes sand from the flow 1702 returning from the wellbore for a predetermined time period such as thirty minutes. During this first test, a certain condition or operation is being performed downhole. The amount of sand captured in the accumulator 720 (and measured/reported by the processors 1900) is represented by the increase in weight of the accumulator 720 while running the first test. At a later time after a change in the condition or new operation is being performed downhole, a second test may be run where the system 700 again removes sand from the flow 1702 for a similar predetermined time period such as thirty minutes. The amount of sand captured by the accumulator 720 is represented by the increase in weight of the accumulator 720 (as measured/reported by the processors 1900) while running the second test. By comparing the measured values of sand weight during the first test versus the second test, operators can know how the change in condition or operation downhole affected sand production. This information can be beneficially utilized in many different applications.

Similarly, in some embodiments the processors dynamically measure a rate of increase of sand accumulation in the accumulator 710 and send real-time alerts via communication interfaces 1906 and/or display 1908 when predetermined threshold rates are reached. The rate can be monitored by the processors 1900 measuring how quickly the weight sensors 1912 indicate increases. Again, this information can be helpful to operators to know that something has changed downhole and is causing a big increase in the volume of sand that is being returned.

In addition to real-time alerts and values sent and displayed by communication interfaces 1906 and display 1908, a historic log of sand measurement data over time may be stored in non-volatile memory 1902. At later times, this data can be downloaded via communication interfaces 1906 at a later time and analyzed by operators using external computers. Beneficially, logging the historic sand weight measurement data over time allows operators to view changes in sand accumulation properties and amounts after a situation has occurred. For instance, if a problem with sand damaging equipment is encountered, the historic log may be checked to determine at what time/date the increase in sand volume occurred which would allow operators to check what was being performed on the well at that time. As such, system 700 may be utilized as an integral part of a sand management system at the well to both remove sand from a flowing well and also to dynamically monitor and report on the amount of sand that is included in the flow at any given time and/or as it changes over time.

In some embodiments, the sand containment vessel 730 is omitted and replaced with a simple conduit from the bottom of accumulator for connection to an external tank or fluid reservoir. For instance, especially when utilized immediately after fracturing of the well has been performed, the amount of sand may so great that onboard storage tank 730 would become full too quickly and need frequent emptying. In situations where the sand accumulation rate within the accumulator 720 is past a desired maximum rate, the accumulator 720 may be emptied into an external tank.

In some embodiments, the containment vessel 730 is included in system 700; however, an onboard storage bypass valve is provided so that if sand accumulation rate is too high as measured by the weight sensors 1912, the onboard containment vessel 730 is bypassed. The processors 1900 may dynamically control the bypass valve utilizing an actuator 1914 in some embodiments based on sensor 1912 input; alternatively, operators may manually configure the system 700 to either utilize the onboard containment vessel 730 or bypass to an external tank depending on expected sand volumes.

Equivalents and Scope

Although the invention has been described in connection with preferred embodiments, it should be understood that various modifications, additions and alterations may be made to the invention by one skilled in the art without departing from the spirit and scope of the invention. For example, although the flow diverter 250 of FIG. 6 has a wider diameter portion 252, in other embodiments, the stem 251 may have a same diameter prior to the splitter wall 254 similar to as illustrated in the flow diverter 1700 of FIGS. 17-18. Likewise, although the flow diverter 1700 of FIGS. 17-18 has a same sized stem formed by conduit 702, in other embodiments the stem may have a wider diameter portion prior to the splitter wall 1704 similar to the wider diameter portion 252 shown in FIG. 6.

Other sizes and shapes of the various vessels 710, 720, 727, 730 can be utilized in other embodiments. For instance, in some embodiments, the accumulator vessel 720 is shorter and wider than illustrated in FIGS. 7-9. In some embodiments, the accumulator vessel 720 is twice as wide and half as high as illustrated in those figures. Likewise, the pressure head element (i.e., conditioner) 727 may be a bit wider and taller than illustrated in those figures. Making these changes is beneficial in some embodiments to increase the additional pressure head exerted by the fluid in the conditioner 727 on the fluid and sand within the accumulator vessel 720. As previously described, when the conditioner 727 is isolated from the accumulator 720 during the second phase of operations by closing valve 125 as illustrated in FIG. 2, all the fluid within the conditioner is beneficially cut off and not unnecessarily transferred to the sand containment vessel 730.

Although triangular platform 760 is beneficial to ensure easy leveling of the accumulator vessel 720 can be achieved, in other embodiments, platform 760 need not be triangular. Likewise, although three load sensor legs 762 are beneficial in some embodiments to equally divide the weight in a stable manner, any number of load sensor legs 762 from one to more than three can be utilized in other embodiments.

While the example embodiments described herein are focused on removal of sand from producing wells which have been subjected to hydraulic fracturing, the physical principles of the separation are amenable to other areas of hydrocarbon production such as removal of particulates generated during SAGD operations, as well as other applications outside of the energy industry, such as separations of solids in water treatment, mining and manufacturing processes, for example. As such, the invention as defined by the claims is intended to cover the use of the systems and methods for such alternative applications.

Other than described herein, or unless otherwise expressly specified, all of the numerical ranges, amounts, values and percentages, such as those for amounts of materials, elemental contents, times and temperatures, ratios of amounts, and others, in the following portion of the specification and attached claims may be read as if prefaced by the word "about" even though the term "about" may not expressly appear with the value, amount, or range. Where the term "about" is used, it is understood to reflect +/−10% of the recited value. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs.

While this invention has been particularly shown and described with references to embodiments thereof, it will be understood by those skilled in the art that various changes in form and details may be made therein without departing from the scope of the invention encompassed by the appended claims.

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context.

It is also noted that the term "comprising" is intended to be open and permits but does not require the inclusion of additional elements or steps. When the term "comprising" is used herein, the term "consisting of" is thus also encompassed and disclosed. Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. In addition, it is to be understood that any particular embodiment of the present invention that falls within the prior art may be explicitly excluded from any one or more of the claims. Since such embodiments are deemed to be known to one of ordinary skill in the art, they may be excluded even if the exclusion is not set forth explicitly herein.

The above described automated functionality may be implemented by software executed by one or more processors 1900 operating pursuant to instructions stored on a tangible computer-readable medium such as a storage device 1902 to perform the above-described functions of any or all aspects of the access controller. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in a general-purpose or specific-purpose computer that performs the above-described functionality as a result of executing the instructions.

In other embodiments, rather than being software modules executed by one or more processors 1900, the above-described functionality may be implemented as hardware modules configured to perform the above-described functions. Examples of hardware modules include combinations of logic gates, integrated circuits, field programmable gate arrays, and application specific integrated circuits, and other analog and digital circuit designs.

Functions of single elements may be separated into multiple units, or the functions of multiple units may be combined into a single element. Likewise, although a plurality of exemplary embodiments have been illustrated, features of the various embodiments may be combined and/or omitted to form other embodiments. All combinations and permutations of the above described features and embodiments may be utilized in conjunction with the invention.

The invention claimed is:

1. A method for removing a particulate matter from a multiphase stream comprising a gas, a liquid and the particulate matter, the method comprising:
   a) conveying the multiphase stream to a first vessel; separating a majority of the gas from the multiphase stream and removing the separated gas from the first vessel; and collecting a slurry of the liquid and the particulate matter from the multiphase stream in the first vessel;
   b) conveying the slurry to a second vessel and separating the particulate matter from the liquid by generating a pressure head of the liquid above the particulate matter to cause the particulate matter to settle in the bottom of the second vessel and compress the particulate matter to force out entrained liquid; and
   c) conveying the particulate matter out of the second vessel,
   wherein step a) occurs continuously, and wherein step b) is halted when step c) occurs.

2. The method of claim 1, further comprising:
   increasing the pressure head by inclusion of a pressure head element in liquid flow communication with the second vessel via a first conduit connecting the pressure head element with the second vessel; and
   controlling fluid flow between the second vessel and the pressure head element utilizing a valve between the second vessel and the pressure head element.

3. The method of claim 1, wherein in step c), the particulate matter is conveyed to a third vessel, and steps a) to c) are repeated until a pre-determined volume of the particulate matter is contained in the third vessel, after which the particulate matter is conveyed out of the third vessel.

4. The method of claim 1, wherein the first vessel is spherical and the multiphase stream is diverted in a downward direction in the first vessel.

5. The method of claim 1, wherein the particulate matter comprises sand and the multiphase stream is production from a hydraulically fractured well.

6. The method of claim 1, wherein in step a), the multiphase fluid is diverted into a plurality of streams flowing downwards in the first vessel.

7. The method of claim 1, wherein in step a), the multiphase stream is conveyed into the first vessel to impact a curved interior wall of the first vessel.

8. The method of claim 1, further comprising measuring the particulate matter settled in the second vessel and upon reaching a predetermined threshold measurement, conveying the particulate matter out of the second vessel.

9. The method of claim 1, wherein the method does not rely on cyclonic flow to remove the particulate matter from the multiphase stream.

10. A method for removing a particulate matter from a multiphase stream comprising a gas, a liquid and the particulate matter, the method comprising:
    conveying the multiphase stream to a first vessel, separating a majority of the gas from the multiphase stream and removing the separated gas from the first vessel;

collecting a slurry of the liquid and the particulate matter from the multiphase stream in the first vessel;

conveying the slurry to a second vessel and separating the particulate matter from the liquid by generating a pressure head of the liquid above the particulate matter to cause the particulate matter to settle in the bottom of the second vessel and compress the particulate matter to force out entrained liquid, wherein the pressure head is increased by inclusion of a pressure head element in liquid flow communication with the second vessel via a first conduit connecting the pressure head element with the second vessel;

controlling fluid flow between the second vessel and the pressure head element utilizing a valve between the second vessel and the pressure head element; and conveying the particulate matter out of the second vessel.

11. The method of claim 10, wherein the pressure head element is positioned to contain the liquid at a higher point than the liquid in the second vessel.

12. The method of claim 10, further comprising:

setting the valve to allow fluid flow during a first phase of operations when the particulate matter is accumulating within the second vessel; and setting the valve to prevent fluid flow during a second phase of operations when the particulate matter is being conveyed out of the second vessel.

13. The method of claim 10, wherein the pressure head element is a pipe having an inner diameter greater than an inner diameter of the conduit, and a height that is higher than a maximum height of the second vessel.

14. The method of claim 10, wherein the multiphase fluid is diverted into a plurality of streams flowing downwards from the first vessel.

15. A method for removing a particulate matter from a multiphase stream comprising a gas, a liquid and the particulate matter, the method comprising:

a) conveying the multiphase stream to a first vessel, wherein the multiphase fluid is diverted into a plurality of streams flowing downwards from the first vessel; separating a majority of the gas from the multiphase stream and removing the separated gas from the first vessel; and collecting a slurry of the liquid and the particulate matter from the multiphase stream in the first vessel;

b) conveying the slurry to a second vessel and separating the particulate matter from the liquid by generating a pressure head of the liquid above the particulate matter to cause the particulate matter to settle in the bottom of the second vessel and compress the particulate matter to force out entrained liquid; and c) conveying the particulate matter out of the second vessel.

16. The method of claim 15, wherein in step a), the multiphase stream is conveyed into the first vessel to impact a splitter wall that divides the multiphase stream into the plurality of streams.

17. The method of claim 16, wherein the plurality of streams are directed by the splitter wall against a backplate angled to direct the flow downwards.

18. The method of claim 17, wherein the plurality of streams are blocked from flowing upwards by an upper plate.

19. The method of claim 15, wherein in step a), the multiphase stream is conveyed into the first vessel to impact a curved interior wall of the first vessel.

20. The method of claim 15, wherein the first vessel is spherical and the multiphase stream is diverted in a downward direction in the first vessel.

* * * * *